US011982953B2

(12) United States Patent
Iwamura

(10) Patent No.: US 11,982,953 B2
(45) Date of Patent: May 14, 2024

(54) CONVEYANCE MEMBER, CONVEYANCE DEVICE, POWDER SUPPLY CONTAINER, AND POWDER UTILIZATION DEVICE

(71) Applicant: FUJIFILM Business Innovation Corp., Tokyo (JP)

(72) Inventor: Takuya Iwamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/989,708

(22) Filed: Nov. 18, 2022

(65) Prior Publication Data

US 2023/0168607 A1 Jun. 1, 2023

(30) Foreign Application Priority Data

Nov. 19, 2021 (JP) ................................ 2021-188919

(51) Int. Cl.
*G03G 15/08* (2006.01)
*G03G 21/18* (2006.01)

(52) U.S. Cl.
CPC ....... *G03G 15/087* (2013.01); *G03G 15/0806* (2013.01); *G03G 21/1821* (2013.01)

(58) Field of Classification Search
CPC ............. G03G 15/087; G03G 15/0806; G03G 21/1821; G03G 15/0891; G03G 15/0889
See application file for complete search history.

(56) References Cited

U.S. PATENT DOCUMENTS

| | | | | |
|---|---|---|---|---|
| 7,899,367 | B2 | 3/2011 | Fukuta | |
| 8,219,008 | B2 | 7/2012 | Tanaka | |
| 9,599,928 | B2 | 3/2017 | Maruyama | |
| 2007/0258732 | A1* | 11/2007 | Tanaka | G03G 15/0877 399/254 |
| 2008/0175629 | A1* | 7/2008 | Eto | G03G 15/087 399/262 |
| 2014/0193178 | A1* | 7/2014 | Iketani | G03G 15/087 399/263 |
| 2015/0063878 | A1* | 3/2015 | Torimoto | G03G 15/0891 399/263 |
| 2016/0342111 | A1* | 11/2016 | Uemura | G03G 15/0891 |
| 2019/0332035 | A1* | 10/2019 | Mimura | G03G 15/0889 |
| 2021/0157256 | A1* | 5/2021 | Nieda | G03G 15/0889 |

FOREIGN PATENT DOCUMENTS

| | | |
|---|---|---|
| JP | H10301377 | 11/1998 |
| JP | 4479693 | 6/2010 |
| JP | 4661625 | 3/2011 |
| JP | 6547340 | 7/2019 |

* cited by examiner

*Primary Examiner* — Sandra Brase
(74) *Attorney, Agent, or Firm* — JCIPRNET

(57) ABSTRACT

A conveyance member includes: a shaft that is rotatably disposed in a passage through powder is conveyed; a first conveyance unit that is provided at the shaft to project in a direction away from the shaft, and includes a plurality of first slits obliquely extending toward the shaft and a first film having flexibility; and a second conveyance unit that is provided at the shaft to project in a direction opposite to the first conveyance unit from the shaft, and includes a plurality of second slits obliquely extending toward the shaft and a second film having flexibility.

15 Claims, 18 Drawing Sheets

CONVEYANCE MEMBER, CONVEYANCE DEVICE, POWDER SUPPLY CONTAINER, AND POWDER UTILIZATION DEVICE

CROSS-REFERENCE TO RELATED APPLICATIONS

This application is based on and claims priority under 35 USC 119 from Japanese Patent Application No. 2021-188919 filed Nov. 19, 2021.

BACKGROUND OF THE INVENTION

(i) Technical Field

The present invention relates to a conveyance member, a conveyance device, a powder supply container, and a powder utilization device.

(ii) Related Art

JP6547340B describes a powder conveyance member that includes a rotation member that rotates within a container in which powder is contained, a contact member formed of a film in which one end is fixed to the rotation member, the other end which is a free end is bent by coming into contact with an inner wall of the container, and a plurality of cuts that have the other end side as a starting end and obliquely extend toward the rotation member as a terminating end are formed in an axial direction of the rotation member, and a plurality of projection portions that are provided in the rotation member in an axial direction, project from the rotation member toward the inner wall of the container, and stir the powder.

JP4661625B describes a developer cartridge and the like that include a container room containing a developer, a rotation shaft rotatably provided in the container room, a flexible member formed of a film which is attached to the rotation shaft and which has a slit extending toward the rotation shaft from an end edge in a direction orthogonal to the rotation shaft, and a column provided at at least one of one end portion and the other end portion in a direction along the rotation shaft and extending in a direction orthogonal to the rotation shaft.

An agitator that includes a shaft body, a film holding member fixed to one side of the shaft body in a radial direction, a film as a flexible member pasted to the film holding member, a second film holding member fixed to the other side of the shaft body in the radial direction (a side opposite to the film holding member), a film as a flexible member pasted to the second film holding member, and a wiper holding member fixed to the second film holding member is illustrated as an agitator that stirs and conveys toner of a developer.

JP H10-301377A describes a toner replenishing device that uses, as an agitator that stirs and conveys toner, a member obtained by integrating a rotation shaft with a rectangular film by insert molding.

SUMMARY

Aspects of non-limiting embodiments of the present disclosure relate to a conveyance member, a conveyance device using the conveyance member, a powder supply container, and a powder utilization device that can suppress a decrease in conveyance ability of powder even though powder is influenced by high humidity and high temperature or vibration during transfer, as compared with a conveyance member that includes a shaft rotatably disposed in a passage through which powder is conveyed, and a conveyance unit provided at the shaft to project only in one direction away from the shaft and including a plurality of slits obliquely extending toward the shaft and a film having flexibility.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a conveyance member including

- a shaft that is rotatably disposed in a passage through powder is conveyed,
- a first conveyance unit that is provided at the shaft to project in a direction away from the shaft, and includes a plurality of first slits obliquely extending toward the shaft and a first film having flexibility, and
- a second conveyance unit that is provided at the shaft to project in a direction opposite to the first conveyance unit from the shaft, and includes a plurality of second slits obliquely extending toward the shaft and a second film having flexibility.

DETAILED DESCRIPTION

Hereinafter, embodiments of the invention will be described with reference to the drawings.

First Embodiment

Figure 1:
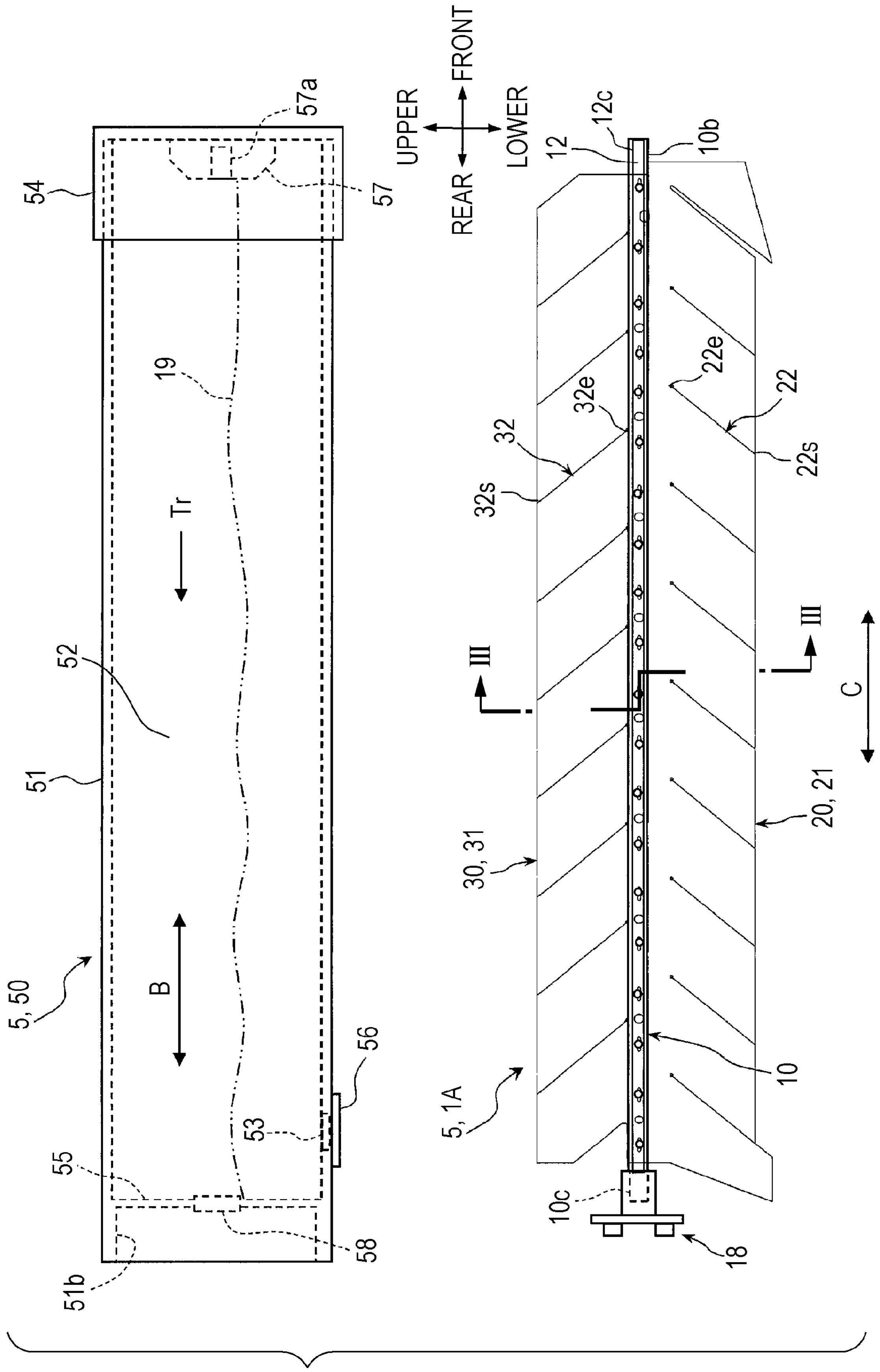
FIG. 1 is a schematic diagram of a powder supply container and a conveyance member according to a first embodiment.
Figure 2:
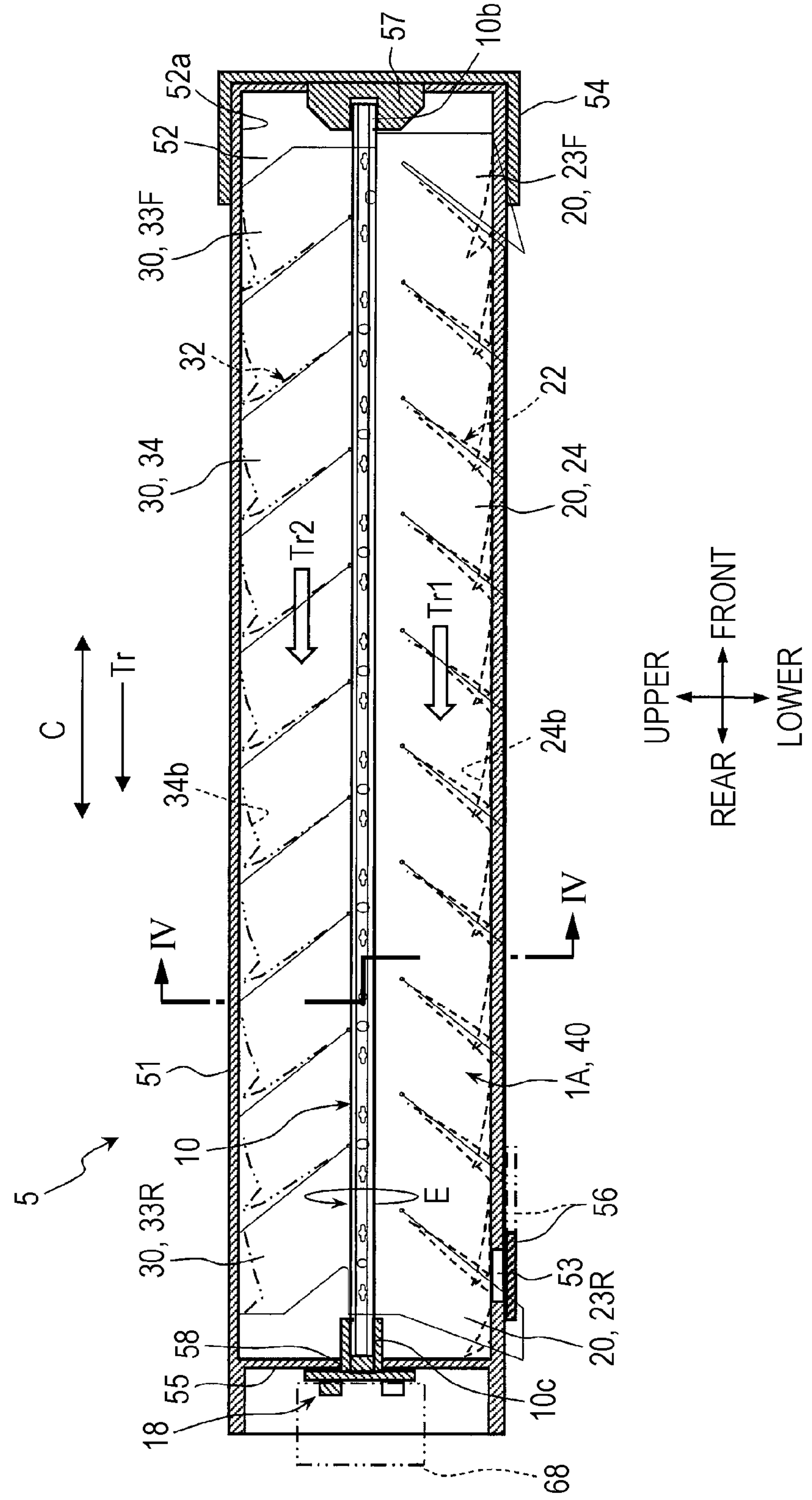
FIG. 2 is a cross-sectional side view illustrating a state where powder of the powder supply container is conveyed.
Figure 3:
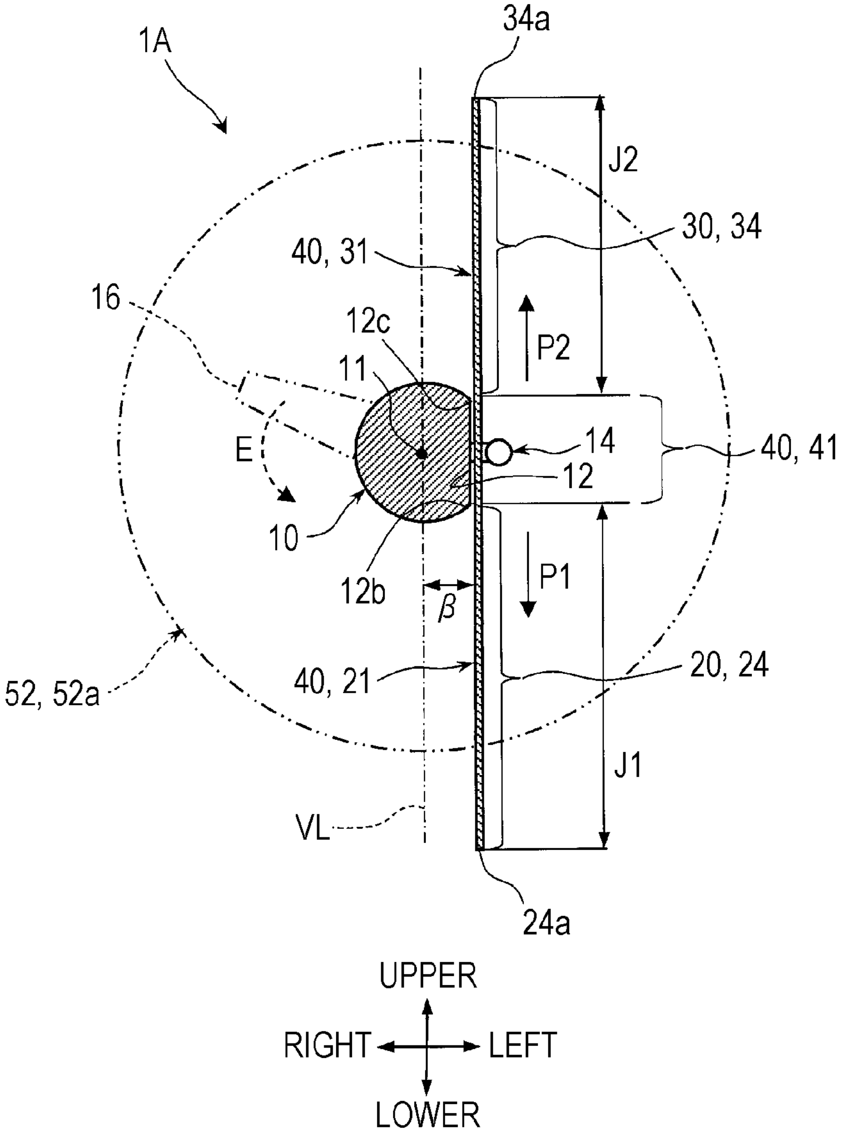
FIG. 3 is a cross-sectional view taken along a line III-III of a conveyance member in FIG. 1.
Figure 4:
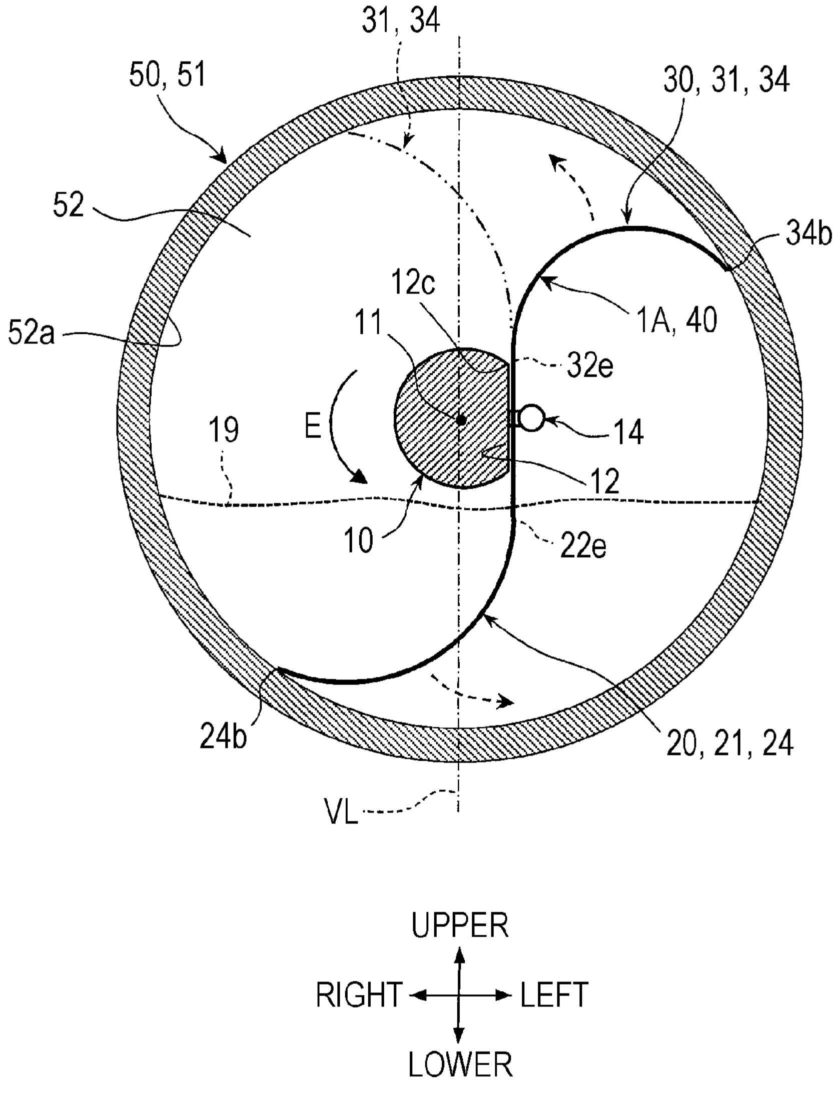
FIG. 4 is a cross-sectional view of the powder supply container in FIG. 2 taken along a line IV-IV.

FIG. 1 is a schematic diagram illustrating components constituting a powder supply container 5 using a conveyance member according to a first embodiment of the disclosure. FIG. 2 is a cross-sectional side view illustrating a state when powder of the powder supply container 5 is conveyed. FIG. 3 is a cross-sectional view of the conveyance member in FIG. 1, and FIG. 4 is a cross-sectional view of the powder supply container 5 in FIG. 2.

<Powder Supply Container>

As illustrated in FIGS. 1 and 3, the powder supply container 5 includes a container body 50 having a passage 52 through which contained powder 19 is conveyed toward a discharge port 53, and a conveyance member 1A rotatably disposed in the passage 52 of the container body 50 to convey the powder 19.

The powder supply container 5 according to the first embodiment is a container that contains and supplies a developer (toner) which is an example of the powder 19. The powder 19 may be a powdery material that can be conveyed by the conveyance member 1A and the like including a shaft 10 to be described later, a first conveyance unit 20 including a film, and a second conveyance unit 30 including a film.

The powder supply container 5 is also configured as a container of a type used in a manner detachably attached to an attachment unit of a device that uses the developer. Thus, the powder supply container 5 may be referred to as a so-called toner cartridge.

First, the container body 50 includes a cylindrical body unit 51 which is open at both ends, a lid unit 54 that closes an opening portion at one end of the body unit 51, a closing unit 55 that closes an opening portion at the other end of the body unit 51, and an opening and closing lid unit 56 that opens and closes the discharge port 53 of the powder provided at a lower portion of the body unit 51 on the other end side.

The passage 52 is provided within the body unit 51. The passage 52 is formed as a columnar space of which a cross section is circular. The passage 52 is preliminarily filled with a predetermined amount of developer as the powder 19. The opening and closing lid unit 56 is configured to hold the discharge port 53 to be in an opened state when the powder supply container 5 is attached to the attachment unit and to hold the discharge port 53 to be in a closed state when the powder supply container 5 is detached from the attachment unit.

For example, the lid unit 54 is used to be detached to open one end of the body unit 51 when the passage 52 of the body unit 51 is filled with the powder 19 and to be attached to close one end of the body unit 51 after the filling. A first bearing unit 57 having a support hole 57*a* in which one end portion of the shaft 10 of the conveyance member 1A is fitted and rotatably supported is provided at an inner center portion of the lid unit 54.

The closing unit 55 is provided at a position slightly inward from the other end of the body unit 51. Accordingly, the closing unit 55 forms a recessed portion 51*b* recessed inward from the other end of the body unit 51. A second bearing unit 58 in which the other end portion of the shaft 10 of the conveyance member 1A is fitted and rotatably supported is provided at a center portion of the closing unit 55. The closing unit 55 is provided as a part of the body unit 51 or is provided by attaching a member different from the body unit 51.

<Conveyance Member>

Next, as illustrated in FIGS. 1 to 3 and the like, the conveyance member 1A includes the shaft 10 that is rotatably disposed at the passage 52 through which the powder 19 is conveyed, the first conveyance unit 20 including a first film 21 that is provided to project in a direction P1 separated from the shaft 10 in an axial direction C of the shaft 10, and the second conveyance unit 30 including a second film 31 that is provided on the shaft 10 to project from the shaft 10 in a direction P2 opposite to the first conveyance unit 20.

The opposite direction P2 is not limited to a direction forming an angle of 180° with the separated direction P1, and includes a direction forming an angle within a range of 180°±45°.

As illustrated in FIG. 1, the shaft 10 is a rod-shaped member extending in a longitudinal direction B of the passage 52 in the container body 50, in other words, along a conveyance direction Tr in which the powder 19 is conveyed.

The shaft 10 has one end 10*b* rotatably supported by the first bearing unit 57 and the other end 10*c* rotatably supported by the second bearing unit 58. A shaft coupling (for example, coupling) 18 that is detachably connected to a driving shaft coupling of a driving transmission unit (not illustrated) is attached to the other end 10*c* of the shaft 10. The other end 10*c* of the shaft 10 is rotatably supported by the second bearing unit 58 via the shaft coupling 18.

As illustrated in FIG. 3, the shaft 10 in the first embodiment is a member having a form in which an elongated attachment surface 12 obtained by cutting a side surface portion into a planar shape at a position shifted from a shaft center 11 of a round bar by a dimension β is provided.

Figure 5:
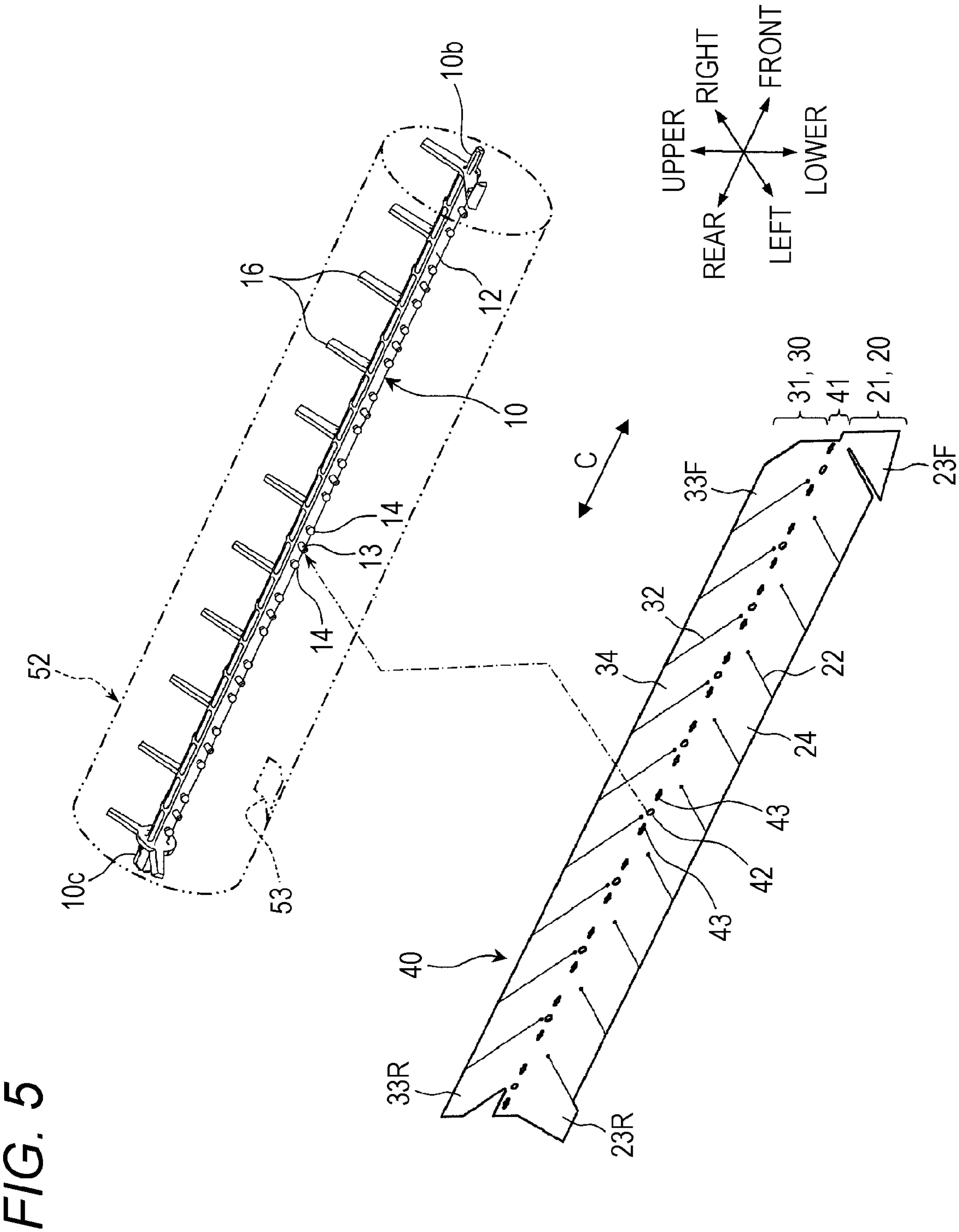
FIG. 5 is a perspective view illustrating a state where the conveyance member is exploded.

As illustrated in FIG. 5, columnar positioning projections 13 for attaching the first film 21 of the first conveyance unit 20 and the second film 31 of the second conveyance unit 30 and locking projections 14 each having a shape in which an upper end is enlarged are provided on the attachment surface 12. As for the positioning projections 13 and the locking projections 14, one positioning projection 13 and two locking projections 14 are combined as one set, and a predetermined number of the sets of the positioning projections 13 and the locking projections 14 are provided at predetermined intervals along the axial direction C.

As illustrated in FIGS. 3 and 5, in the shaft 10 according to the first embodiment, a plurality of stirring units 16 that stir the powder 19 are provided on a side surface portion opposite to the attachment surface 12. The stirring units 16 are rod-shaped portions projecting in a direction away from the shaft, and are provided at predetermined intervals in the axial direction C of the shaft 10.

These stirring units 16 are not essential and may be omitted.

Figure 6:
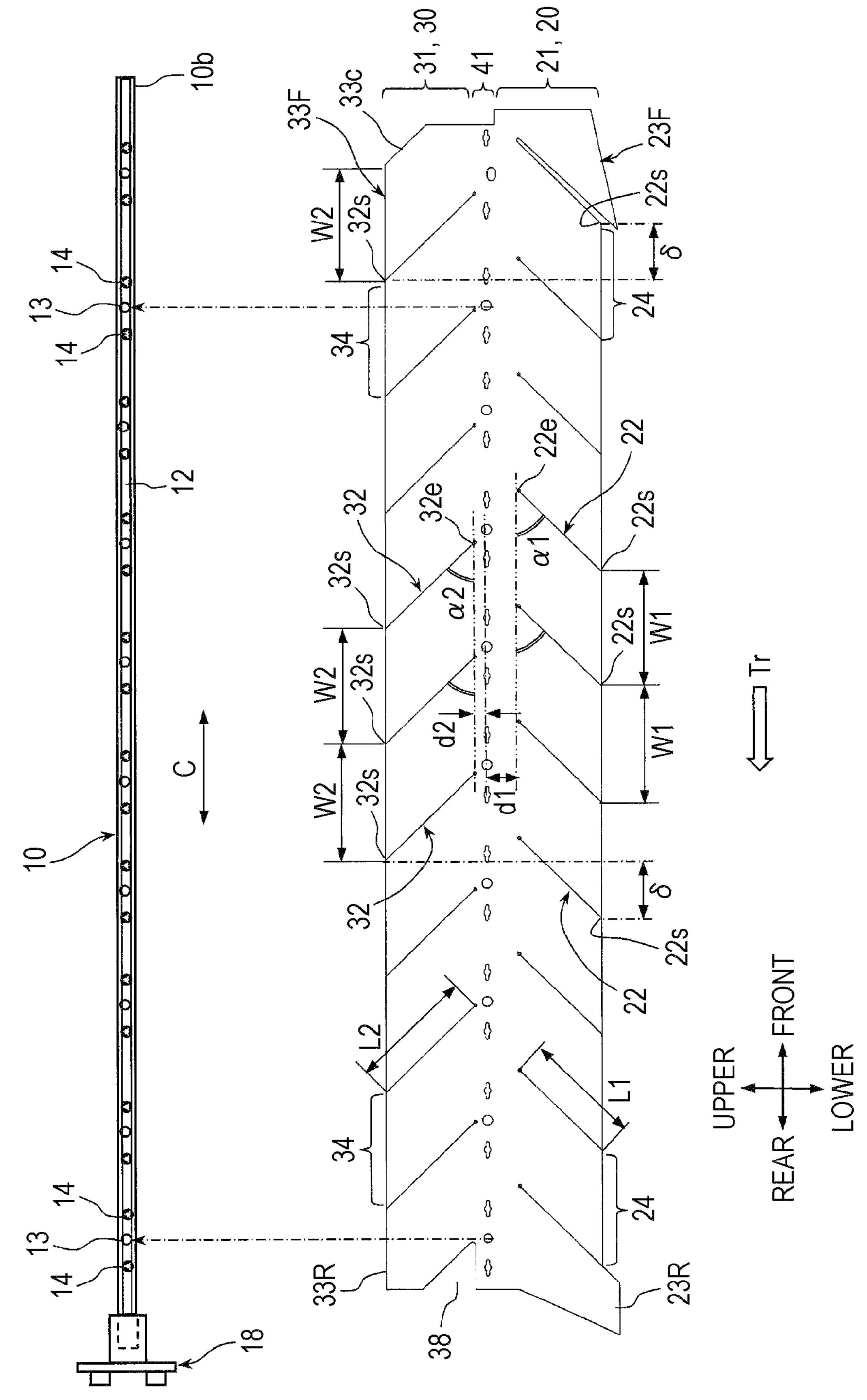
FIG. 6 is a side view of a shaft of the conveyance member and a film constituting a conveyance unit.

As illustrated in FIGS. 1 and 6 and the like, the first conveyance unit 20 includes a plurality of first slits 22 that obliquely extend toward the shaft 10 and the first film 21 having flexibility.

The first slits 22 are portions for dividing the first film 21 such that a plurality of conveyance blades that project from the shaft 10 and obliquely extend to actually convey the powder 19 are present along the axial direction C. Linear cuts are employed as the first slits 22 in the first embodiment, by way of example. The first slit 22 is a cut line formed such that an inclination angle $\alpha 1$ is an acute angle with respect to the axial direction C to fall toward the conveyance direction Tr of the powder 19. The inclination angle $\alpha 1$ of the first slit 22 is set to, for example, 45°.

Ten first slits 22 are provided in the first film 21, and thus, the first conveyance unit 20 in the first embodiment is a conveyance unit in which two end portion conveyance blades 23F and 23R present at both ends in the axial direction C and a plurality of (in this example, nine) inner conveyance blades 24 are present between the end portion conveyance blades 23F and 23R.

The end portion conveyance blades 23F and 23R are each formed to adapt the shapes of both ends of the passage 52 and a circumstance of whether or not there are components such as bearing units present at both the ends. The plurality of inner conveyance blades 24 are each formed in a parallelogram shape obliquely inclined along the inclination angles $\alpha 1$ of the first slits 22.

The flexibility of the first film 21 is a physical property in which the first film is elastically deformed to be bent in a curved shape when the first film is moved while coming into contact with a certain material (the powder 19, an inner wall of the passage 52, or the like). This flexibility is indicated as, for example, a longitudinal elastic modulus. The longitudinal elastic modulus may be, for example, equal to or greater than 4 GPa.

For example, a resin film such as polyethylene terephthalate (PET) is applied as the first film 21. It is preferable that a thickness of the first film 21 is a value in a range of from 100 μm to 200 μm.

As illustrated in FIG. 3, etc., the first conveyance unit 20 is configured such that a length J1 of the first film 21 projecting from the shaft 10 has a predetermined value. The length J1 projecting from the shaft 10 is a length of a portion away from the shaft 10 excluding a portion used for attaching the first film 21 to the shaft 10. In the first embodiment, the length J1 of the first film 21 projecting from a surface of the shaft 10 is based on a projecting length of the inner conveyance blade 24.

As illustrated in FIGS. 1 and 6, etc., the second conveyance unit 30 includes a plurality of second slits 32 that obliquely extend toward the shaft 10 and a second film 31 having flexibility.

The second slits 32 are portions for dividing the second film 31 such that a plurality of inner conveyance blades 34 that project from the shaft 10 and obliquely extend to actually convey the powder 19 are present along the axial direction C. As in the case of the first slits 22, linear cuts as a first example thereof are employed as the second slits 32 in the first embodiment. The second slit 32 is a cut line formed such that an inclination angle $\alpha 2$ is an acute angle with respect to the axial direction C to fall toward the conveyance direction Tr of the powder 19. As in the case of the first slits 22, the inclination angle $\alpha 2$ of the second slit 32 is set to, for example, 45°.

Nine second slits 32 are provided in the second film 31, and thus, the second conveyance unit 30 in the first embodiment is a conveyance unit in which two end portion conveyance blades 33F and 33R present at both ends in the axial direction C and a plurality of (in this example, eight) inner conveyance blades 34 are present between the end portion conveyance blades 33F and 33R.

The end portion conveyance blades 33F and 33R are each formed to adapt the shape of both ends of the passage 52 and a circumstance of whether or not there are components such as bearing units at both the ends. The plurality of inner conveyance blades 34 are each formed in a parallelogram shape obliquely inclined along the inclination angles $\alpha 2$ of the second slits 32.

In the second conveyance unit 30, a notch portion 38 having a right-angled triangle shape of which an oblique side is an oblique line along the inclination angle $\alpha 2$ is formed in a portion of the end portion conveyance blade 33R close to the shaft 10. The notch portion 38 functions to reduce the contact of the second conveyance unit 30 with the powder 19 during the rotation of the conveyance member 1A and reduce a driving torque required during the rotation.

The flexibility of the second film 31 is the same physical property as the flexibility of the first film 21. The flexibility is also indicated as, for example, a longitudinal elastic modulus. The longitudinal elastic modulus may be, for example, equal to or greater than 4 GPa.

For example, a resin film such as polyethylene terephthalate (PET) is applied as the second film 31. It is preferable that a thickness of the second film 31 is a value in a range of from 100 μm to 200 μm.

As illustrated in FIG. 3, etc., the second conveyance unit 30 is configured such that a length J2 of the second film 31 projecting from the shaft 10 has a predetermined value. The length J2 projecting from the shaft 10 is a length of a portion away from a surface of the shaft 10 excluding a portion used for attaching the second film 31 to the shaft 10. In the first embodiment, the length J2 of the second film 31 projecting from the shaft 10 is based on a projecting length of the inner conveyance blade 34.

In the first embodiment, as illustrated in FIGS. 3, 5, and 6, etc., the first film 21 and the second film 31 are formed as an integrated body of one film 40.

The film 40 is a film having a substantially rectangular shape that is long in a direction along the axial direction C before processing.

As illustrated in FIG. 6, etc., in the film 40, a portion extending over the entire region in a longitudinal direction at a substantially central position in a transverse direction is processed as an attachment unit 41 used for attachment to the shaft 10. In the film 40, one portion (lower side in FIG. 6) of the attachment unit 41 is processed as the first film 21 constituting the first conveyance unit 20. In the film 40, the other portion (upper side in FIG. 6) of the attachment unit 41 is processed as the second film 31 constituting the second conveyance unit 30.

As illustrated in FIG. 6, etc., the attachment unit 41 is a rectangular portion that is elongated and extends in a longitudinal direction of the film 40. As illustrated in FIG. 5, the attachment unit 41 includes positioning holes 42 to be fitted to the positioning projections 13 in the shaft 10 and attachment holes 43 to be fitted to the locking projections 14 in the shaft 10.

The positioning hole 42 is formed as a substantially circular hole. The attachment hole 43 is formed as a hole having a central hole portion having a diameter smaller than an enlarged head portion of the locking projection 14 and auxiliary hole portions projecting and extending from both sides of the central hole portion along the axial direction C.

The above-described plurality of first slits 22 and the like are provided, and thus, a portion of the film 40 to be the first film 21 is processed to have a form having the above-described end portion conveyance blades 23F and 23R and the plurality of inner conveyance blades 24.

The above-described plurality of second slits 32 and the like are provided, and thus, a portion of the film 40 to be the second film 31 is processed to have a form having the above-described end portion conveyance blades 33F and 33R and the plurality of inner conveyance blades 34.

As illustrated in FIGS. 3 and 5, etc., the conveyance member 1A is assembled by attaching the film 40 to the attachment surface 12 of the shaft 10.

Specifically, the positioning holes 42 and the attachment holes 43 in the attachment unit 41 of the film 40 are fitted to the positioning projections 13 and the locking projections 14 on the attachment surface 12 of the shaft 10, respectively.

Accordingly, the film 40 is attached to the shaft 10, and thus, the conveyance member 1A is completed.

As described above, the conveyance member 1A is assembled by simply performing a work of attaching one film 40 to the shaft 10, and the number of assembly steps is reduced and cost is also reduced as compared with the case of the conveyance member in which the first film 21 and the second film 31 are formed as separate films.

As illustrated in FIG. 3, in the conveyance member 1A, the film 40 is attached to the attachment surface 12 at a position shifted from the shaft center 11 of the shaft 10 by a dimension β.

Thus, the conveyance member 1A is in a state where the first conveyance unit 20 and the second conveyance unit 30 are provided on portions (the attachment surface 12) of the shaft 10 that do not pass through the shaft center 11.

As illustrated in FIG. 3, the conveyance member 1A is configured such that the film 40 including a portion constituting the first film 21 and the second film 31 is attached to the same attachment surface 12 of the shaft 10.

Thus, in the conveyance member 1A, the first conveyance unit 20 and the second conveyance unit 30 are provided at positions shifted on the same side from the shaft center 11 of the shaft 10. As illustrated in FIG. 3, a case where the conveyance units are provided at the positions shifted on the same side at this time means a case where, when an imaginary line VL passing through the shaft center 11 and extending in an upper-lower direction is drawn, for example, both the first conveyance unit 20 and the second conveyance unit 30 are present to be away from the shaft center 11 in one region of two left and right regions divided by the imaginary line VL as a boundary.

As illustrated in FIG. 3, etc., in the conveyance member 1A, the length J1 of the first film 21 constituting the first conveyance unit 20 projecting from the shaft 10 is a length equal to or greater than a value at which the first film reaches and comes into contact with an inner wall 52*a* of the passage 52 when the conveyance member 1A is disposed at the passage 52.

In the conveyance member 1A, the length J2 of the second film 31 constituting the second conveyance unit 30 projecting from the shaft 10 is a value smaller than the length of the first conveyance unit 20 (the length J1 of the first film 21 projecting from the shaft 10 ($J2<J1$).

As illustrated in FIG. 3, the projecting length J1 in the first embodiment is a length from one end (lower end in FIG. 3) 12*b* of the attachment surface 12 of the shaft 10 to a free end 24*a* of the inner conveyance blade 24 of the first film 21. As illustrated in FIG. 3, the projecting length J2 is a length from the other end (upper end in FIG. 3) 12*c* of the attachment surface 12 of the shaft 10 to a free end 34*a* of the inner conveyance blade 34 of the second film 31.

Here, as for the second film 31 constituting the second conveyance unit 30, when it is assumed that the projecting length J1 of the first film 21 is equal to or greater than a value at which the first film comes into contact with the inner wall 52*a* of the passage 52, the projecting length J2 of the second film 31 may be equal to or greater than a value at which the second film comes into contact with the inner wall 52*a* of the passage 52 or may be a value at which the second film does not come into contact with the inner wall 52*a* of the passage 52.

As illustrated in a lower part of FIG. 1 and FIG. 6, etc., the first slit 22 and the second slit 32 in the conveyance member 1A are disposed in a positional relationship in which starting ends 22*s* and 32*s* start to extend toward the shaft 10 are shifted from each other in the axial direction C with the shaft 10 interposed therebetween.

The starting ends 22*s* and 32*s* at this time are ends where the cuts of the first slit 22 and the second slit 32 are started. As illustrated in FIG. 6, the starting end 22*s* of the first slit 22 and the starting end 32*s* of the second slit 32 in the first embodiment are shifted by a dimension δ (shift amount).

Since both the first slit 22 and the second slit 32 are the linear cuts extending at the same inclination angles α1 and α2, terminating ends 22*e* and 32*e* where the cuts are ended are also disposed in the same positional relationship as in the case of the starting ends 22*s* and 32*s*.

In the first embodiment, when the starting end 22*s* of the first slit 22 disposed on an uppermost stream side in the conveyance direction Tr of the powder 19 expected by the conveyance member 1A is used as a reference, the starting end 32*s* of the second slit 32 is disposed to be positioned on a downstream side of the starting end 22*s* of the first slit 22 in the conveyance direction Tr.

As illustrated in FIG. 6, in the first slit 22 and the second slit 32 in the conveyance member 1A, adjacent intervals W1 and W2 of the starting ends 22*s* and 32*s* have the same value.

Since the first slit 22 and the second slit 32 are the linear cuts extending at the same inclination angles α1 and α2, the intervals W1 and W2 at this time have a relationship corresponding to widths of the inner conveyance blades 24 and 34 in the axial direction C. Thus, it can be said that the inner conveyance blades 24 and 34 in the conveyance member 1A has the same width along the axial direction C. Due to this relationship, the end portion conveyance blade 33F in the second conveyance unit 30 is formed as an oblique side 33*c* (FIG. 6) obtained by cutting off corners of a free end such that a width thereof is W2.

As illustrated in FIG. 6, in the conveyance member 1A, a length L2 of the second slit 32 extending toward the shaft 10 is equal to or greater than a length of the first slit 22 (a length L1 of the first slit 22 extending toward the shaft 10) ($L2 \geq L1$). The extending lengths L1 and L2 of the first slit 22 and the second slit 32 are the lengths of the starting end 22*s* and 32*s* and the terminating ends 22*e* and 32*e*.

In the first embodiment, the extending length L2 of the second slit 32 is set to a value greater than the extending length L1 of the first slit 22 ($L2>L1$).

As illustrated in FIG. 6, in the conveyance member 1A, a distance d2 of the terminating end 32*e* at which the second slit 32 ends extending to the shaft 10 is equal to or less than a distance (a distance d1 of the terminating end 22*e* to the shaft 10) equal to or less than a distance of the first slit 22 (d2≤d1). The distances d1 and d2 of the terminating ends 22*e* and 32*e* to the shaft 10 are distances to a position corresponding to the shaft center 11 (a midpoint of the attachment surface 12 in the upper-lower direction).

In the first embodiment, the distance d2 of the terminating end 32*e* of the second slit 32 to the shaft 10 is set to a value less than the distance d1 of the terminating end 22*e* of the first slit 22 to the shaft 10 (d2≤d1). As illustrated in a lower part of FIG. 1, the terminating end 32*e* of the second slit 32 is configured to be present at a position close to or at a position that reaches the other end 12*c* of the attachment surface 12 of the shaft 10.

The above-described conveyance member 1A is rotatably attached within the passage 52 in the container body 50 of the powder supply container 5.

That is, as illustrated in FIG. 2, within the passage 52 of the conveyance member 1A, the other end 10*c* of the shaft 10 is attached to the second bearing unit 58 of the closing unit 55 via the shaft coupling 18, while one end 10*b* of the shaft 10 is attached to the first bearing unit 57 of the lid unit 54.

Accordingly, the powder supply container 5 is assembled.

In actuality, when the powder supply container 5 is assembled, a process of filling the passage 52 with a predetermined amount of developer which is the powder 19 in a state where the conveyance member 1A is disposed within the passage 52 of the container body 50 and then fitting and attaching the lid unit 54 to the container body 50 is necessary. Through this process, the powder supply container 5 is completed as illustrated in FIG. 2.

As illustrated in FIG. 4, the conveyance member 1A in the powder supply container 5 is used in a state where the first film 21 of the first conveyance unit 20 and the second film 31 of the second conveyance unit 30 are bent to be warped to an upstream side of the shaft 10 in a rotational direction E.

Specifically, in the first conveyance unit 20, as illustrated in FIG. 2, the free ends of the end portion conveyance blades 23F and 23R of the first film 21 and free ends 24*b* of the plurality of inner conveyance blades 24 come into contact with the inner wall 52*a* of the passage 52. As indicated by broken lines in FIGS. 2 and 7 or by solid lines in FIG. 4, the first conveyance unit 20 is in a state where the end portion conveyance blades 23F and 23R and the plurality of inner conveyance blades 24 are curved to be convex to the upstream side in the rotational direction E between the terminating end 22*e* of the first slit 22 and the free end 24*b*.

In the second conveyance unit 30, as illustrated in FIG. 2, the free ends of the end portion conveyance blades 33F and the 33R of the second film 31 and the free ends 34*b* of the plurality of inner conveyance blades 34 come into contact with the inner wall 52*a* of the passage 52. As indicated by dashed double-dotted lines in FIGS. 2 and 7 or by solid lines in FIG. 4, the second conveyance unit 30 is in a state where the end portion conveyance blades 33F and 33R and the plurality of inner conveyance blades 34 are curved to be convex to the upstream side in the rotational direction E between the terminating end 32*e* and the free end 34*b* of the second slit 32.

The distance d2 of the terminating end 32*e* of the second slit 32 to the shaft 10 is less than the distance d1 of the terminating end 22*e* of the first slit 22 to the shaft 10, as illustrated in FIG. 4, the plurality of inner conveyance blades 34 in the second conveyance unit 30 are curved from positions closer to the shaft 10 than the plurality of inner conveyance blades 24 of the first conveyance unit 20. Accordingly, the inner conveyance blades 34 of the second conveyance unit 30 are easily curved to be warped to the upstream side in the rotational direction E substantially as in the inner conveyance blades 24 of the first conveyance unit 20, and thus, a favorable conveyance force is easily obtained.

In the conveyance member 1A, as indicated by a dashed double-dotted line in FIG. 4, when the inner conveyance blades 34 in the second conveyance unit 30 are curved to a downstream side in the rotational direction E, the entire film 40 including the first conveyance unit 20 has a left-right reversed C-shape, and thus, a favorable conveyance force in the conveyance direction Tr is not obtained.

The powder supply container 5 is used by being detachably attached to an attachment unit of a device to be used.

When the powder supply container 5 is attached to the attachment unit, as indicated by a dashed double-dotted line in FIG. 2, the opening and closing lid unit 56 opens the discharge port 53, and the shaft coupling 18 of the shaft 10 is connected to a driving shaft coupling 68 of a driving unit of a device to be used (not illustrated).

<Operation of Powder Supply Container>

Next, an operation of the powder supply container 5 will be described.

As illustrated in FIGS. 2 and 4, in the powder supply container 5, when a rotational force is input to the shaft 10 in the conveyance member 1A via the shaft coupling 18, the conveyance member 1A rotates in a direction indicated by an arrow E with the shaft 10 within the passage 52 as a center.

At this time, in the conveyance member 1A, the first film 21 of the first conveyance unit 20 and the second film 31 of the second conveyance unit 30 in the film 40 receive a restriction and friction due to contact with the inner wall 52*a* of the passage 52 or resistance due to contact with the powder 19 within the passage 52. Thus, the conveyance member 1A circulates and moves around the shaft 10 in a state where the first film 21 of the first conveyance unit 20 and the second film 31 of the second conveyance unit 30 are bent to be curved and warped to the upstream side of the shaft 10 in the rotational direction E.

Here, as in the first film 21 of the first conveyance unit 20, it is assumed that the second film 31 of the second conveyance unit 30 has a length with which the second film comes into contact with the inner wall 52*a* of the passage 52.

At this time, as illustrated in FIG. 4, the plurality of inner conveyance blades 24 of the first film 21 and the plurality of inner conveyance blades 34 of the second film 31 at this time are bent substantially in an S shape as a whole with the position of the attachment surface 12 shifted from the shaft center 11 of the shaft 10 being substantially in the center.

Figure 7:
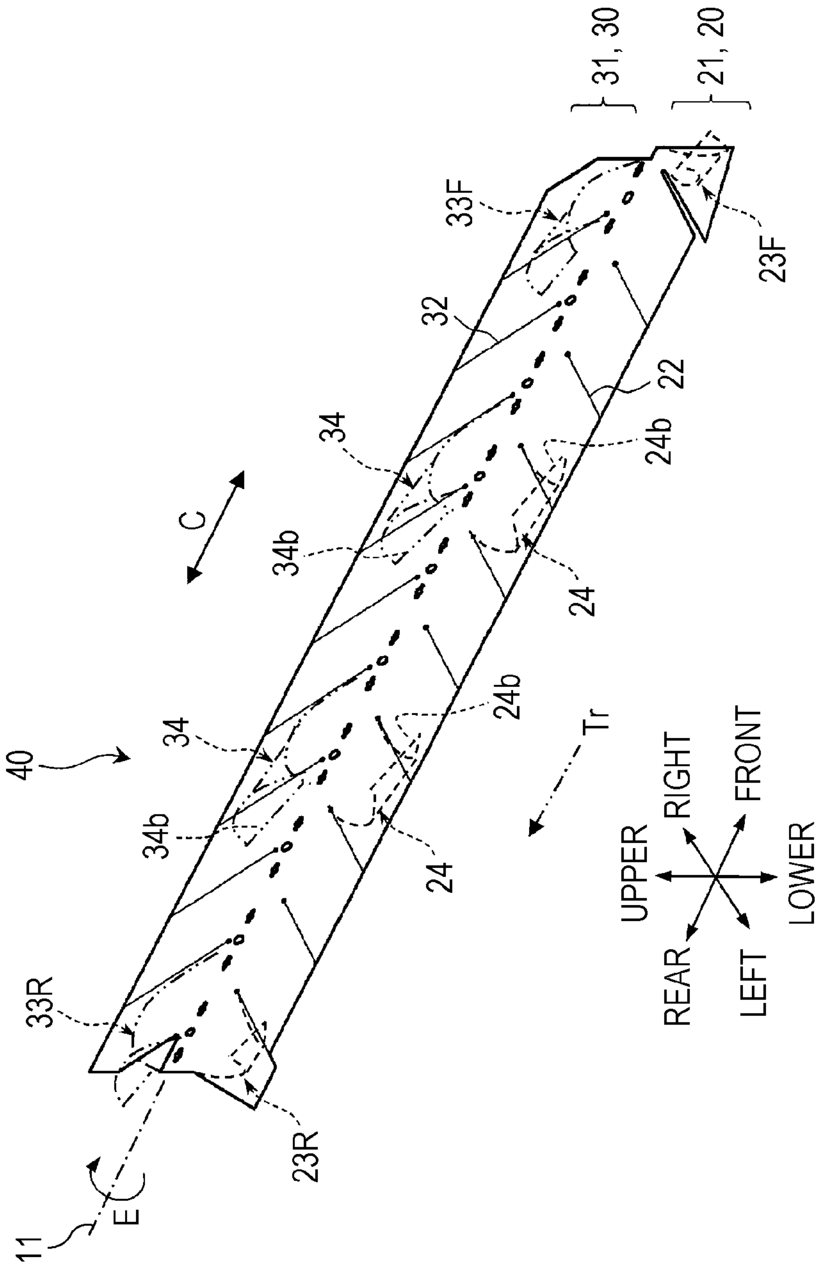
FIG. 7 is a perspective view illustrating a state where a first conveyance unit and a second conveyance unit of the conveyance member perform conveyance.

As illustrated in FIGS. 2 and 7, the inner conveyance blades 24 of the first film 21 at this time pass in a state where an end portion of the free end 24*b* on an upstream side of the powder 19 in the conveyance direction Tr comes into contact with the inner wall 52*a* of the passage 52 on the downstream side in the rotational direction E than the end portion of the free end 24*b* on the upstream side in the conveyance direction Tr.

The inner conveyance blades 34 of the second film 31 pass in a state where an end portion of the free end 34*b* on a downstream side of the powder 19 in the conveyance direction Tr comes into contact with the inner wall 52*a* of the passage 52 on the upstream side in the rotational direction E than the end portion of the free end 34*b* on the upstream side.

Accordingly, the plurality of inner conveyance blades 24 of the first film 21 convey the powder 19 within the passage 52 in a conveyance direction Tr1 indicated by a white arrow in FIG. 2 as a whole while the powder 19 is slightly conveyed to the downstream side in the rotational direction E as indicated by a broken arrow in FIG. 4.

On the other hand, the plurality of inner conveyance blades 34 of the second film 31 convey the powder 19 within the passage 52 to a conveyance direction Tr2 indicated by a white arrow in FIG. 2 as a whole while the powder 19 is slightly conveyed to the downstream side in the rotational direction E as indicated by a dashed arrow in FIG. 4.

As illustrated in FIG. 6, since the starting end 22*s* of the first slit 22 and the starting end 32*s* of the second slit 32 have a positional relationship in which these ends are shifted from each other in the axial direction C, the plurality of inner conveyance blades 24 and the plurality of inner conveyance blades 34 alternately circulate and move back and forth in the axial direction C.

As a result, as illustrated in FIG. 2, in the conveyance member 1A, the powder 19 within the passage 52 is conveyed to be fed forward in the conveyance direction Tr mainly by the conveyance force of the plurality of inner conveyance blades 24 in the first conveyance unit 20 and the conveyance force of the plurality of inner conveyance blades 34 in the second conveyance unit 30.

Accordingly, in the powder supply container 5, the powder 19 within the passage 52 is conveyed toward the discharge port 53 on the downstream side in the conveyance direction Tr by the rotational driving of the conveyance member 1A, and is finally discharged from the discharge port 53.

Incidentally, in the conveyance member 1A, the first film 21 and the second film 31 have shapes having a dimensional relationship as described above.

Thus, when the conveyance member 1A is attached to and assembled with the powder supply container 5, even though the conveyance member is assembled in a state where the inner conveyance blades 34 of the second conveyance unit 30 are curved toward the downstream side in the rotational direction E as indicated by a dashed double-dotted line in FIG. 4, a posture of the conveyance member is automatically changed to a state where the inner conveyance blades 34 are bent toward the upstream side of the shaft 10 in the rotational direction E when the conveyance member is rotated and driven for the first time.

Accordingly, it is possible to prevent the conveyance member 1A from not obtaining a favorable conveyance force in the conveyance direction Tr due to the rotation of the entire film 40 including the first conveyance unit 20 while the left-right reversed C-shape is maintained.

<Experiment 1>

Next, Experiment 1 regarding conveyance performance by the conveyance member 1A in the powder supply container 5 will be described.

In Experiment 1, the powder supply container 5 according to an example embodiment including the conveyance member 1A having the following configuration was filled with a predetermined amount of developer of the powder 19, the powder supply container 5 was stored in a normal-temperature normal-humidity (22° C. and 55% RH) environment for 48 hours, and then a discharge amount (mg/sec) of toner per second was measured when the conveyance member 1A was rotated in the normal-temperature normal-humidity environment under the following driving conditions.

At this time, a container body having a columnar passage 52 of which a cross section having an inner diameter of about 49 mm is circular is used as the container body 50 of the powder supply container 5. About 240 g of an emulsion aggregation (EA)-black toner was used as the developer.

As the shaft 10 in the conveyance member 1A, the attachment surface 12 having a vertical width of 7 mm is provided in a round-bar-shaped synthetic resin member at a position shifted from the shaft center 11 by a dimension β of 3 mm (see the shaft 10 in an upper part in FIG. 6) was used. An arc portion of a cross section of the shaft 10 other than the attachment surface 12 has a diameter of about 7 mm.

A film (see the film 40 in a lower part of FIG. 6) manufactured by processing the film 40 including a PET film (longitudinal elastic modulus: 4 GPa or more) having a film thickness of about 180 m to become the first film 21 of the first conveyance unit 20 and the second film 31 of the second conveyance unit 30 was used as the first conveyance unit 20 and the second conveyance unit 30 in the conveyance member 1A.

At this time, in each of the first slit 22 and the second slit 32, a plurality of cut lines having the inclination angles α1 and α2 of 45° were formed such that the intervals W1 and W2 were about 35 mm with respect to the axial direction C, and the cut lines were formed such that the starting ends 22*s* and 32*s* thereof were alternately shifted by half of the intervals W1 and W2 in the axial direction C. The first slits 22 were formed such that the distance d2 of the terminating end 22*e* to the shaft 10 was about 5 mm. The second slits 32 were formed such that the distance d2 of the terminating end 32*e* to the shaft 10 was about 0 mm.

As a result, the first conveyance unit 20 includes nine inner conveyance blades 24 each having the projecting length J1 of about 31 mm, and the second conveyance unit 30 includes eight inner conveyance blades 34 each having the projecting length J2 of about 27 mm.

The conveyance member 1A was rotated while being driven at a rotation speed of 4.3 rpm for 0.5 seconds at intervals of 0.5 seconds. The discharge amount of toner was calculated as an average value for 5 seconds.

Figure 8A:
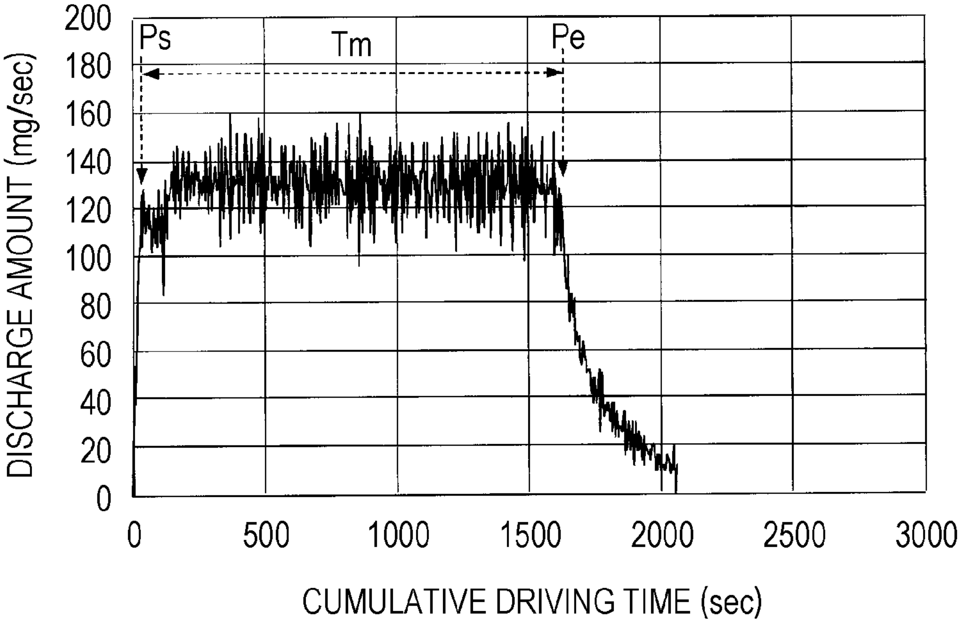
FIG. 8A is a graph illustrating a measurement result when there is no stress in Example of Experiment 1.

The measurement results at this time are illustrated in FIG. 8A.

In Experiment 1, after the powder supply container 5 of the above example was filled with the same amount of powder 19, the following stress was applied, and the discharge amount of toner was measured under the same conditions except for the environmental conditions.

The stress was applied by applying vertical tapping (vibration) 400 times with a rear end of the powder supply container 5 filled with the powder 19 facing downward and then applying a heat history of storing the powder supply container for 48 hours in an environment of a temperature of 45° C. and a humidity of 95% RH. In Experiment 1, the measurement was performed in a high-temperature high-humidity (28° C. and 85% RH) experimental environment.

Figure 8B:
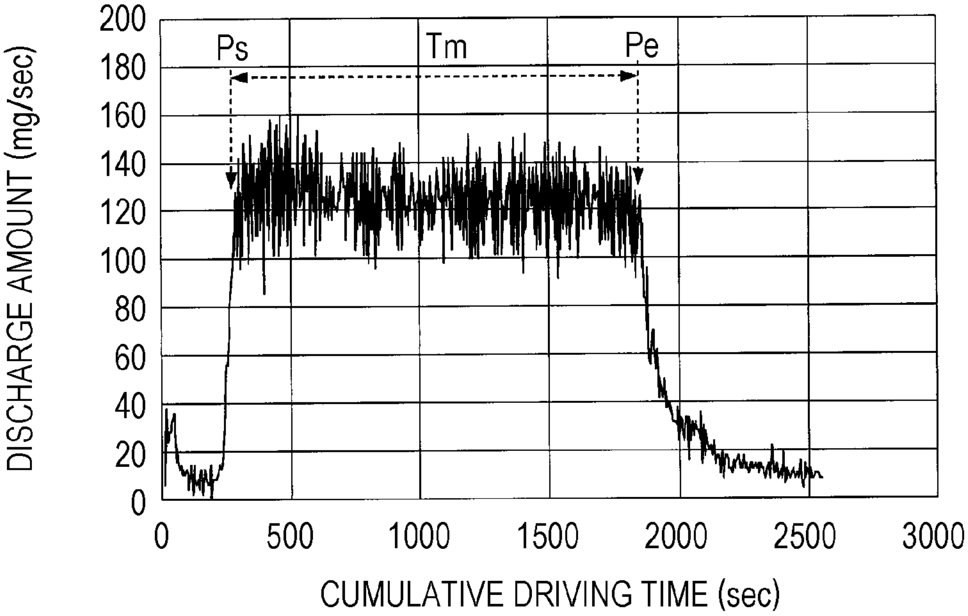
FIG. 8B is a graph representing a measurement result when there is stress in Example.

The measurement results at this time are illustrated in FIG. 8B.

In Experiment 1, a powder supply apparatus according to a comparative example in which a conveyance member 1X according to the comparative example under the following conditions was applied as the conveyance member 1A of the powder supply containers 5 according to the above-described example was prepared, and the discharge amount of toner was measured under two different conditions (a case where there is the stress and a case where there is no stress) as in the example.

Figure 9A:
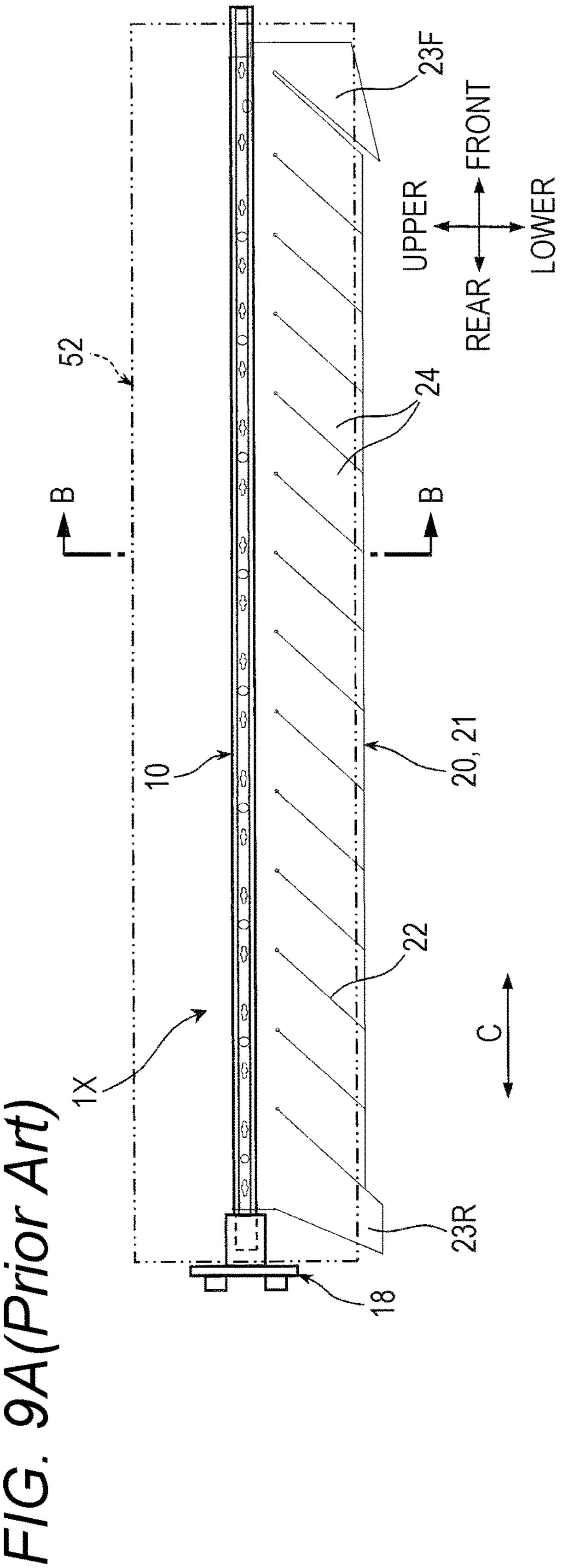
FIG. 9A(Prior Art)
FIG. 9A is a side view of a conveyance member of a comparative example in Experiment 1.
Figure 9B:
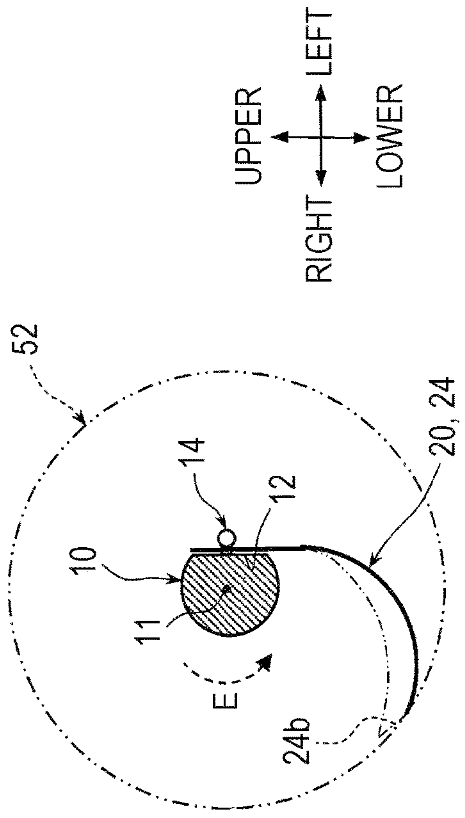
FIG. 9B(Prior Art)
FIG. 9B is a cross-sectional view of the conveyance member of FIG. 9A taken along a line B-B.

As illustrated in FIGS. 9A and 9B, the conveyance member 1X according to the comparative example does not include the second conveyance unit 30 and includes the first conveyance unit 20 including the first film 21.

Figure 10A:
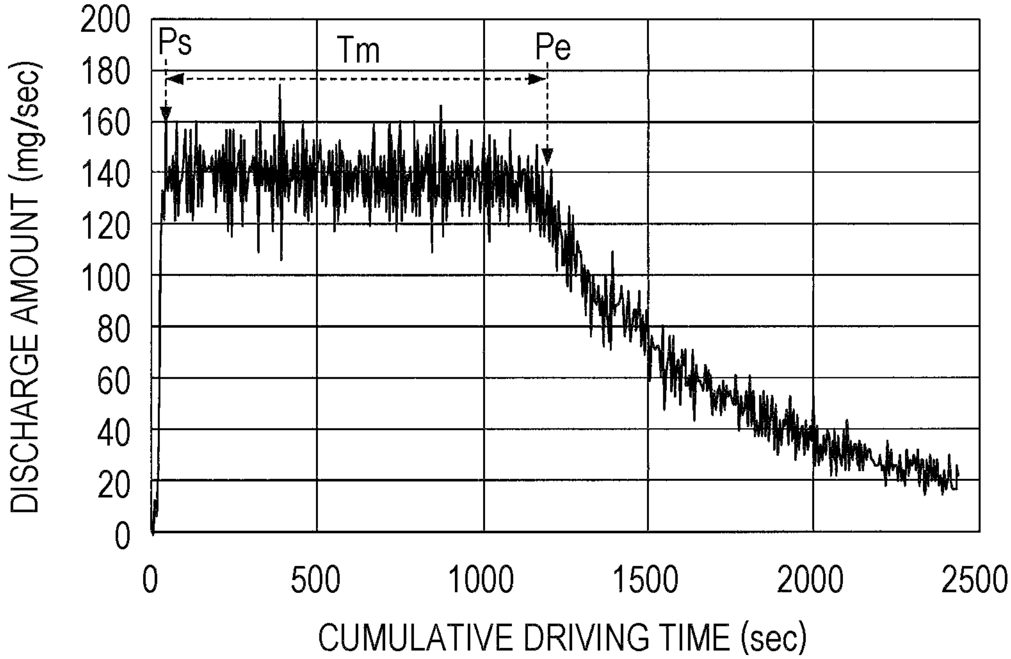
FIG. 10A(Prior Art)
FIG. 10A is a graph representing a measurement result of a comparative example in Experiment 1 when there is no stress.
Figure 10B:
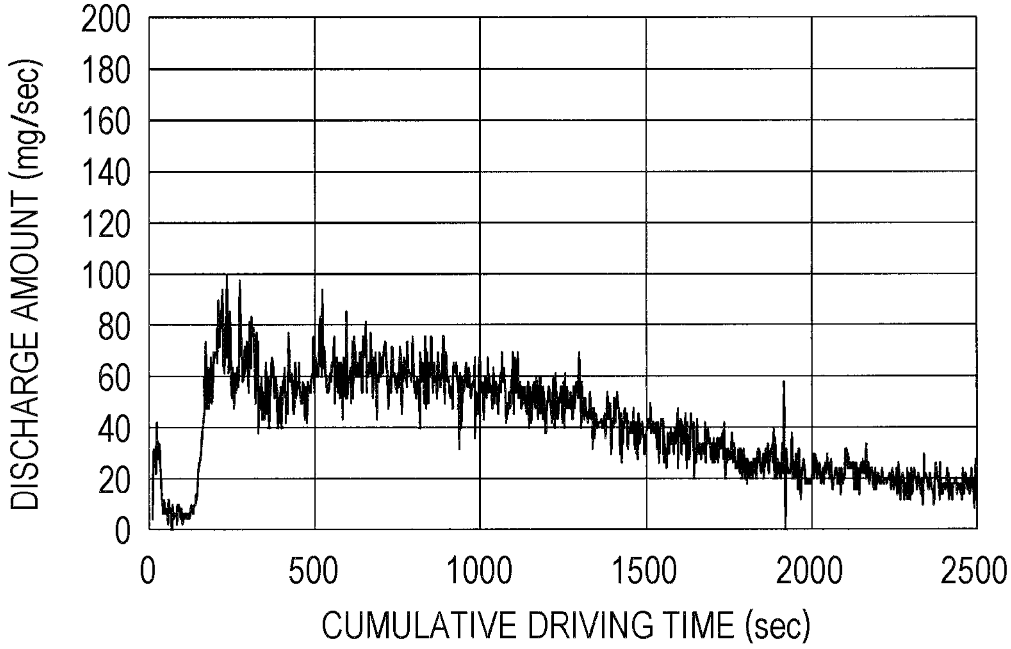
FIG. 10B(Prior Art)
FIG. 10B is a graph representing a measurement result of a comparative example when there is stress.

FIG. 10A illustrates a measurement result in a case where there is no stress at this time, and FIG. 10B illustrates a measurement result in a case where there is the stress.

The following matters can be seen from the measurement results of Experiment 1.

First, as illustrated in FIGS. 10A and 10B, in the powder supply container to which the conveyance member 1X according to the comparative example is applied, when the stress (the influence of high humidity and high temperature or the influence of vibration) is applied to the powder 19 (FIG. 10B), a conveyance ability of the powder 19 is lower than when the stress is not applied to the powder 19 (FIG. 10A).

In contrast, in the powder supply container 5 to which the conveyance members 1A according to the example is applied, as illustrated in FIGS. 8A and 8B, even when the stress is applied to the powder 19 (FIG. 8B), a time when effective discharge starts becomes slightly late than when the stress is not applied to the powder 19 (FIG. 8A) or when the stress is not applied to the powder 19 (FIG. 10B) according to the comparative example, but a decrease in the conveyance ability of the powder 19 is suppressed.

When a total driving time when the discharge amount of toner per second (for example, 120 mg/sec or more) equal to or greater than a certain amount is obtained in FIGS. 8A and 8B and 10 is defined as an "effective discharge time", the conveyance ability at this time is evaluated as a degree of maintenance of the "effective discharge time".

In FIGS. 8A and 8B and 10, a point at which the discharge amount of toner per second equal to or greater than a certain amount is initially obtained is a "discharge start point Ps", and a point at which the discharge amount of toner is not obtained is a "discharge end point Pe". An "effective discharge time Tm" is a driving time between the discharge start point Ps and the discharge end point Pe.

In this regard, as illustrated in FIG. 10B, in the powder supply container to which the conveyance member 1X according to the comparative example is applied, the effective discharge time Tm is not obtained.

<Experiment 2>

Next, Experiment 2 regarding the conveyance performance by the conveyance member 1A in the powder supply container 5 will be described.

Figure 11A:
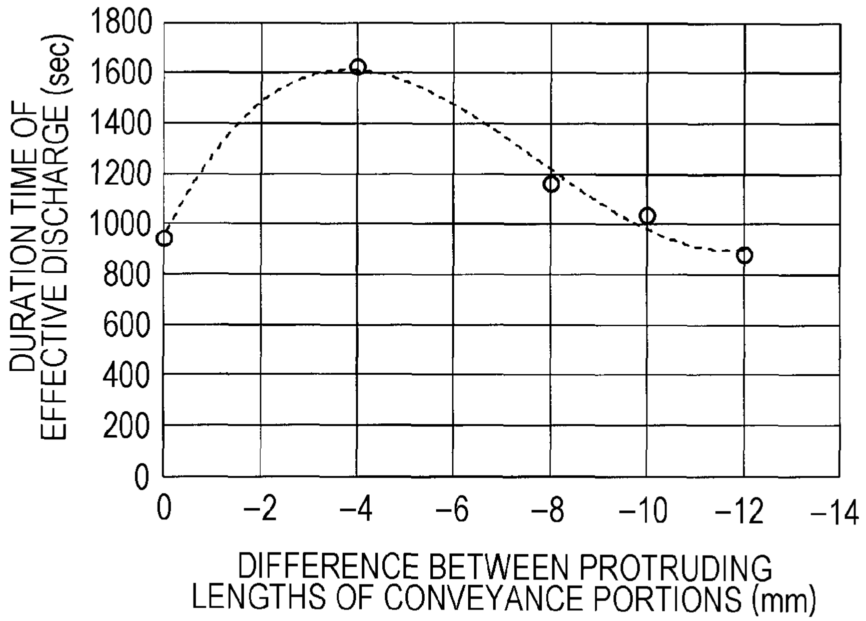
FIG. 11A is a graph representing an aggregated result of measurement results of Experiment 2.

In Experiment 2, a plurality of conveyance members changed such that the projecting length J2 of the second film 31 of the second conveyance unit 30 with respect to the projecting length J1 of the first film 21 of the first conveyance unit 20 was expressed as a difference in the projecting length illustrated in FIG. 11A were prepared as the conveyance member 1A.

In Experiment 2, the same discharge amount of toner as in Experiment 1 was measured in the normal-temperature and normal-humidity experimental environment without applying the stress of Experiment 1 to each of the powder supply containers 5 to which each of the changed conveyance members 1A was applied.

The projecting length J1 of the first film 21 of the first conveyance unit 20 was set to about 31 mm as in the case of Experiment 1. The passage 52 of which a cross section is circular in the powder supply container 5 has an inner diameter of about 49 mm, and a length in a radial direction from the surface of the portion of the shaft 10 other than the attachment surface 12 to the inner wall 52*a* of the passage 52 is about 21 mm.

Figure 11B:
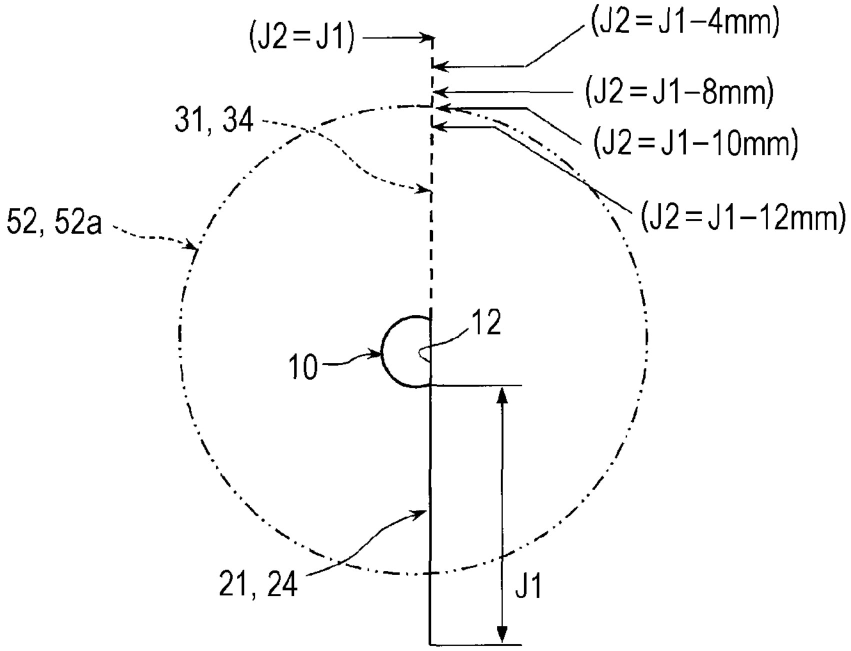
FIG. 11B is a conceptual diagram illustrating a relationship between projecting lengths of conveyance units of conveyance members prepared in Experiment 2.

As illustrated in FIG. 11B, the projecting length J2 of the second film 31 was variously changed with the projecting length J1 of the first film 21 as a reference.

Figure 12A:
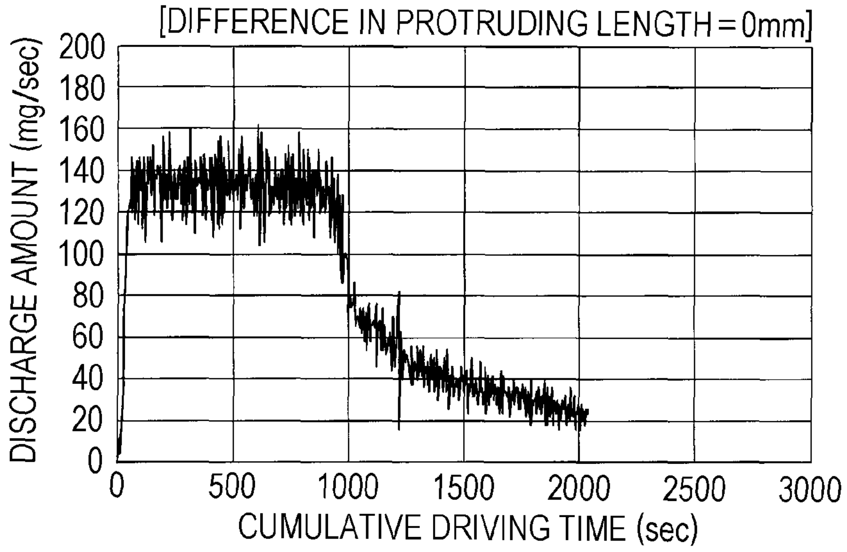
FIGS. 12A to 12C are graphs representing measurement results of a difference in the projecting length in Experiment 2.
Figure 12B:
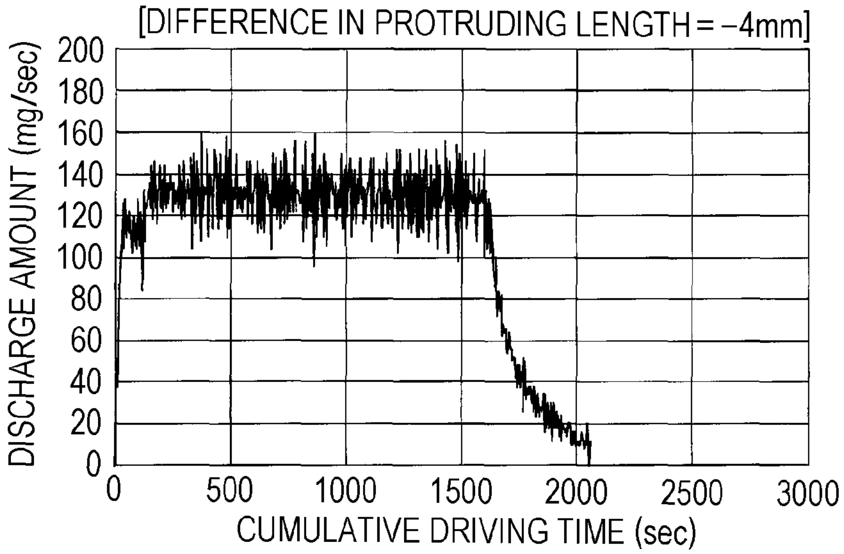
Figure 12C:
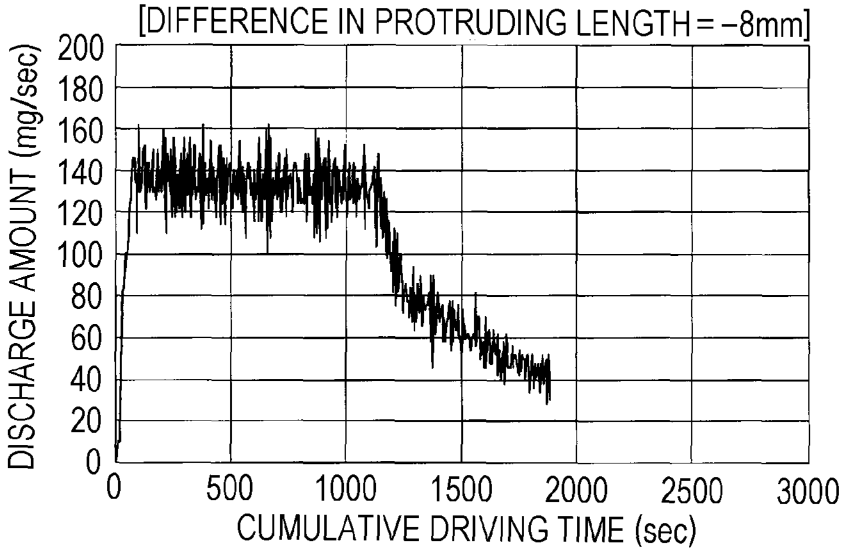
Figure 13A:
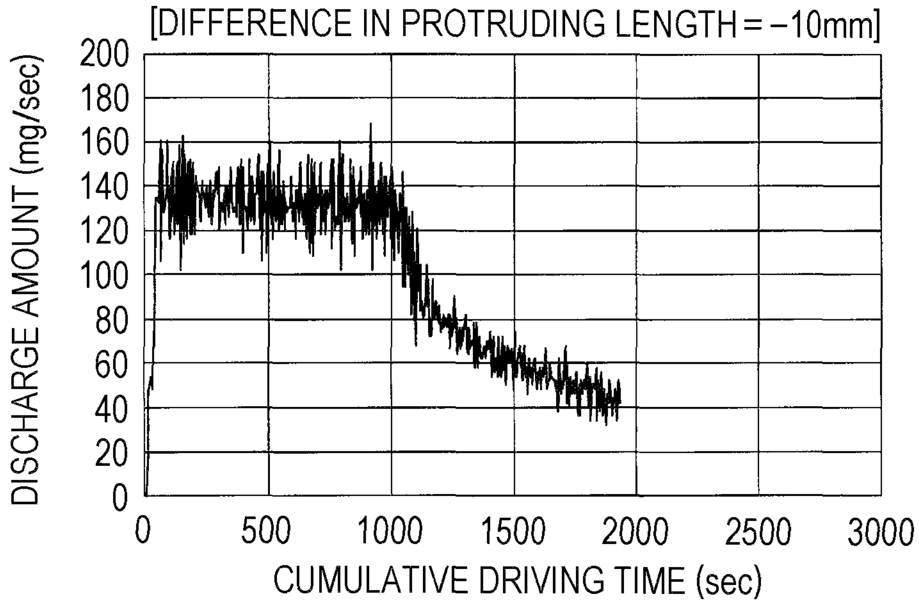
FIGS. 13A and 13B are graphs representing another measurement result in the case of the difference in the projecting length in Experiment 2.
Figure 13B:
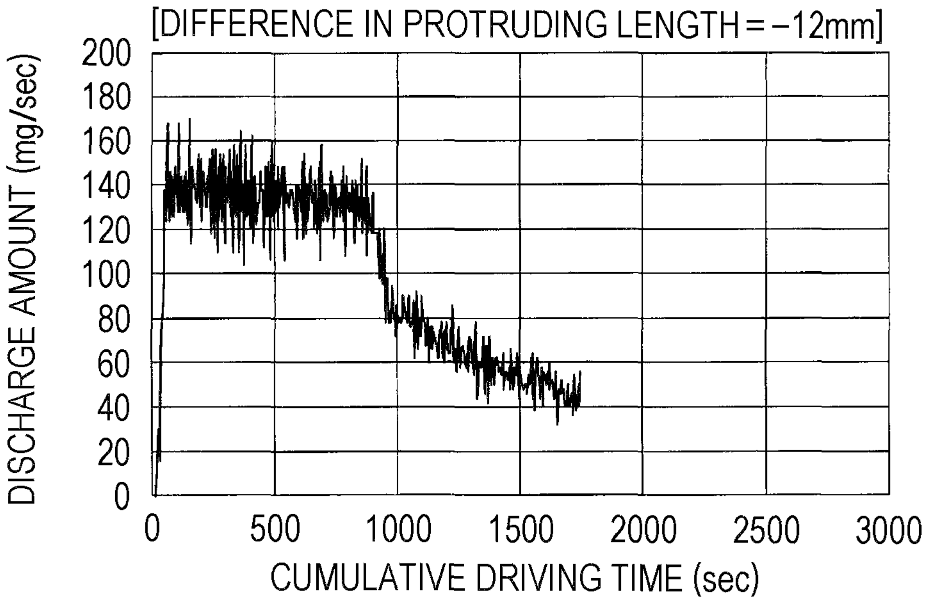

The measurement results of Experiment 2 are illustrated in FIGS. 12 and 13. The difference in the projecting length in FIGS. 12A to 12C and FIGS. 13A and 13B is a difference between the projecting length J1 and the projecting length J2.

FIG. 11A illustrates aggregated results for effective discharge times in the measurement results. In FIG. 11A, an approximate curve is indicated by a broken line.

From the measurement results of Experiment 2, for example, the following matters can be said.

First, as illustrated in FIGS. 11A to 13B, the effective discharge time becomes the longest when the projecting length J2 of the second film 31 with respect to the projecting length J1 of the first film 21 are set to a length of "−4 mm".

When it is determined from the results illustrated in FIG. 11A, from the viewpoint of obtaining a conveyance performance of 1000 seconds or more as the effective discharge time, the projecting length J2 of the second film 31 of the second conveyance unit 30 may be set to a length in a range of "0<J2<−10 mm" with respect to the projecting length J1 of the first film 21 of the first conveyance unit 20.

From the viewpoint of obtaining a conveyance performance of 1200 seconds or more as the effective discharge time, the projecting length J2 of the second film 31 of the second conveyance unit 30 may be set to a length in a range of "−1 mm<J2<−8 mm" with respect to the projecting length J1 of the first film 21 of the first conveyance unit 20.

From the viewpoint of obtaining a conveyance performance of 1400 seconds or more as the effective discharge time, the projecting length J2 of the second film 31 of the second conveyance unit 30 may be set to a length in a range of "−2 mm<J2<−6 mm" with respect to the projecting length J1 of the first film 21 of the first conveyance unit 20.

Second Embodiment

Figure 14:
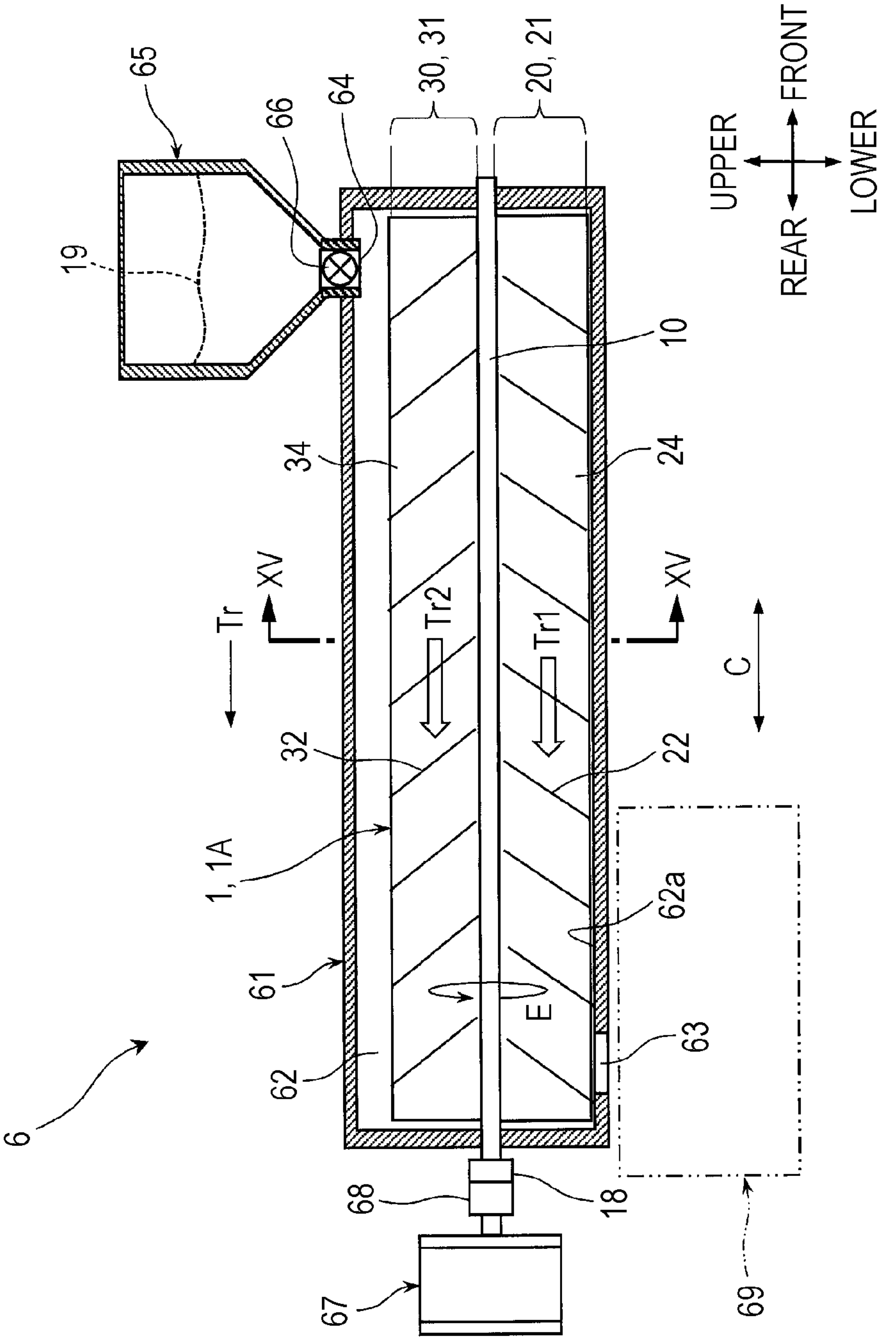
FIG. 14 is a schematic cross-sectional side view of a conveyance device according to a second embodiment.
Figure 15:
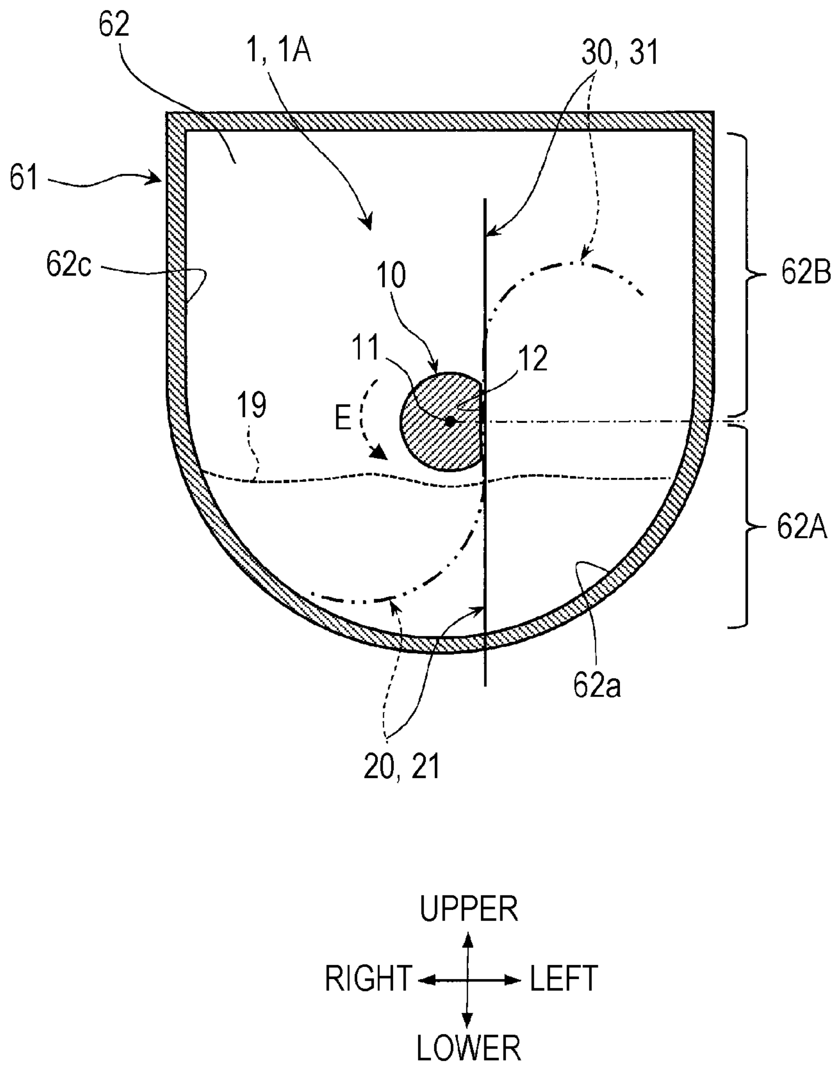
FIG. 15 is a cross-sectional view taken along a line XV-XV of FIG. 14.

FIG. 14 is a schematic diagram of a conveyance device 6 according to a second embodiment of the present invention. FIG. 15 is a cross-sectional view taken along a line XV-XV of FIG. 14.

<Conveyance Device>

As illustrated in FIG. 14, the conveyance device 6 includes a passage body 61 having a passage 62 through which the powder 19 is conveyed, a conveyance member 1 that is rotatably disposed in the passage body 61 to convey the powder 19, and a driving unit 67 that rotates the conveyance member 1. Examples of the powder 19 include the developer described in the first embodiment, and the present invention is not limited thereto.

As illustrated in FIG. 15, in the passage body 61, the passage 62 is a passage having a shape obtained by combining a lower passage unit 62A having a semicircular cross section and an upper passage unit 62B having a quadrangular cross section that is continuous with the lower passage unit 62A.

In the passage body 61, a discharge port 63 through which the powder 19 is discharged is provided at a bottom portion of the lower passage unit 62A near an end portion on a downstream side in a conveyance direction Tr in which the powder 19 is to be conveyed by the conveyance member 1.

In the passage body 61, an intake port 64 through which the powder 19 is taken into the passage 62 is provided in an upper surface portion of the upper passage unit 62B near an end portion on an upstream side in the conveyance direction Tr.

A containing body 65 as a conveyance source that contains and feeds the powder 19 is disposed to be connected to the intake port 64 of the passage body 61.

Near the intake port 64, a feeding member 66 that rotates and feeds the powder 19 contained within the containing body 65 is provided in the containing body 65.

A connection body 69 as a conveyance destination that receives the powder 19 conveyed by the conveyance member 1 and discharged from the discharge port 63 is disposed to be connected to the discharge port 63 of the passage body 61.

The connection body 69 is, for example, a reception body such as a container that only receives the powder 19 discharged from the discharge port 63, a structure such as a device that receives and uses the powder 19, or relay conveyance means for receiving the powder 19 and conveying the powder 19 to another conveyance destination.

The conveyance member 1 is the conveyance member 1A according to the first embodiment. In this case, the contents such as the shapes of the end portion conveyance blades 23F and 23R of the first conveyance unit 20 and the end portion conveyance blades 33F and 33R of the second conveyance unit 30 in the conveyance member 1 are suitable for the shape of the passage 62, the conveyance conditions, and the like.

The conveyance member 1 is configured such that at least the first film 21 of the first conveyance unit 20 rotates while coming into contact with an inner wall 62*a* of the lower passage unit 62A of the passage 62 of the passage body 61.

As illustrated by a dashed double-dotted line in FIG. 15, the conveyance member 1 is used in a state where the first film 21 of the first conveyance unit 20 and the second film 31 of the second conveyance unit 30 are bent to be warped to the upstream side of the shaft 10 in the rotational direction E.

The driving unit 67 is a portion that generates a rotational force and transmits the rotational force to the conveyance member 1. The driving unit 67 includes, for example, a driving source such as a motor and a transmission mechanism that transmits a rotational power of the driving source. The transmission mechanism is configured such that the driving shaft coupling 68 provided in a transmission shaft is connected to the shaft coupling 18 at the other end of the shaft 10 of the conveyance member 1.

<Operation and Performance of Conveyance Device>

As illustrated in FIGS. 14 and 15, in the conveyance device 6, when the rotational force is transmitted from the driving unit 67 to the shaft 10 in the conveyance member 1, the conveyance member 1 rotates about the shaft 10 within the passage 62 of the passage body 61 in a direction indicated by an arrow E.

At this time, as illustrated by a dashed double-dotted line in FIG. 15, the conveyance member 1 circulates and rotates around the shaft 10 in a state where the first film 21 of the first conveyance unit 20 and the second film 31 of the second conveyance unit 30 are bent to be curved and warped to the upstream side of the shaft 10 in the rotational direction E within the passage 62.

When the first film 21 and the second film 31 pass through the upper passage unit 62B of the passage 62, the first and second films are substantially separated from the inner wall 62*c* of the upper passage unit 62B. However, a state where the first film 21 and the second film 31 are bent to be warped to the upstream side of the shaft 10 in the rotational direction E circulates and move while being maintained to some extent due to rotation, deformity, or the like, and the inner wall 62*c* comes into contact with the films 21 and 31 again to meet the films 21 and 31 at the time of transition from the upper passage unit 62B to the lower passage unit 62A. Thus, the films are returned to the original bent posture.

When a predetermined amount of powder 19 is taken into the passage body 61 from the containing body 65 as the conveyance source in the conveyance device 6, the conveyance of the powder 19 by the conveyance member 1 is started.

In this case, in the first conveyance unit 20 in the conveyance member 1, the plurality of inner conveyance blades 24 of the first film 21 mainly convey the powder 19 within the passage 62 in the conveyance direction Tr1 indicated by a white arrow in FIG. 14. In the second conveyance unit 30 in the conveyance member 1, the plurality of inner conveyance blades 34 of the second film 31 mainly convey the powder 19 within the passage 62 to the conveyance direction Tr2 indicated by a white arrow in FIG. 14.

As a result, in the conveyance device 6, the powder 19 is conveyed to be fed forward in the conveyance direction Tr within the passage 62 by the main conveyance force of the plurality of inner conveyance blades 24 in the first conveyance unit 20 and the main conveyance force of the plurality of inner conveyance blades 34 in the second conveyance unit 30 in the conveyance member 1.

Accordingly, in the conveyance device 6, the powder 19 within the passage 62 fed from the containing body 65 is conveyed toward the discharge port 63 on the downstream side in the conveyance direction Tr by the rotational driving of the conveyance member 1, and is finally discharged from the discharge port 63. Accordingly, the powder 19 is fed to the connection body 69 as a conveyance destination.

Since the conveyance member 1 is formed by applying the conveyance member 1A or the like according to the first embodiment, even though the powder 19 is influenced by high humidity and high temperature or vibration, the conveyance device 6 can convey the powder 19 while the decrease in the conveyance ability of the powder 19 is suppressed substantially as in the case of the conveyance member 1A.

In the conveyance device 6, the conveyance member 1 is used in a state where the first film 21 of the first conveyance unit 20 and the second film 31 of the second conveyance unit 30 are bent to be warped to the upstream side of the shaft 10 in the rotational direction E. Thus, in the conveyance device 6, as compared with the case of the conveyance device to which a conveyance member that is not used in this state is applied, the conveyance performance of the powder 19 by the conveyance member 1 is easily obtained, and the powder 19 is favorably conveyed.

<Modification of Conveyance Device>

In the conveyance device 6, other powder such as powder paint or edible powder may be applied as the powder 19 instead of the developer.

Third Embodiment

Figure 16:
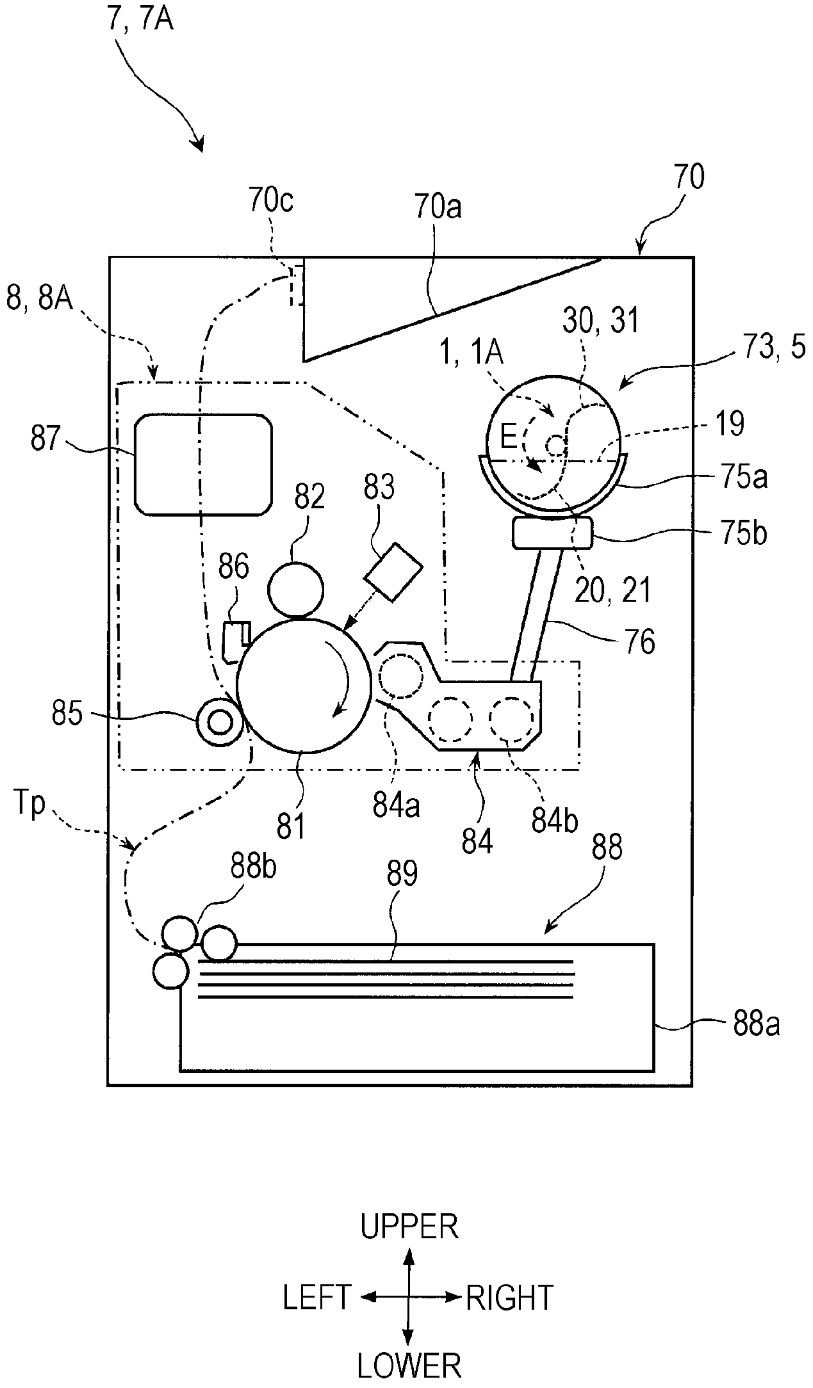
FIG. 16 is a schematic diagram of a powder utilization device according to a third embodiment.
Figure 17:
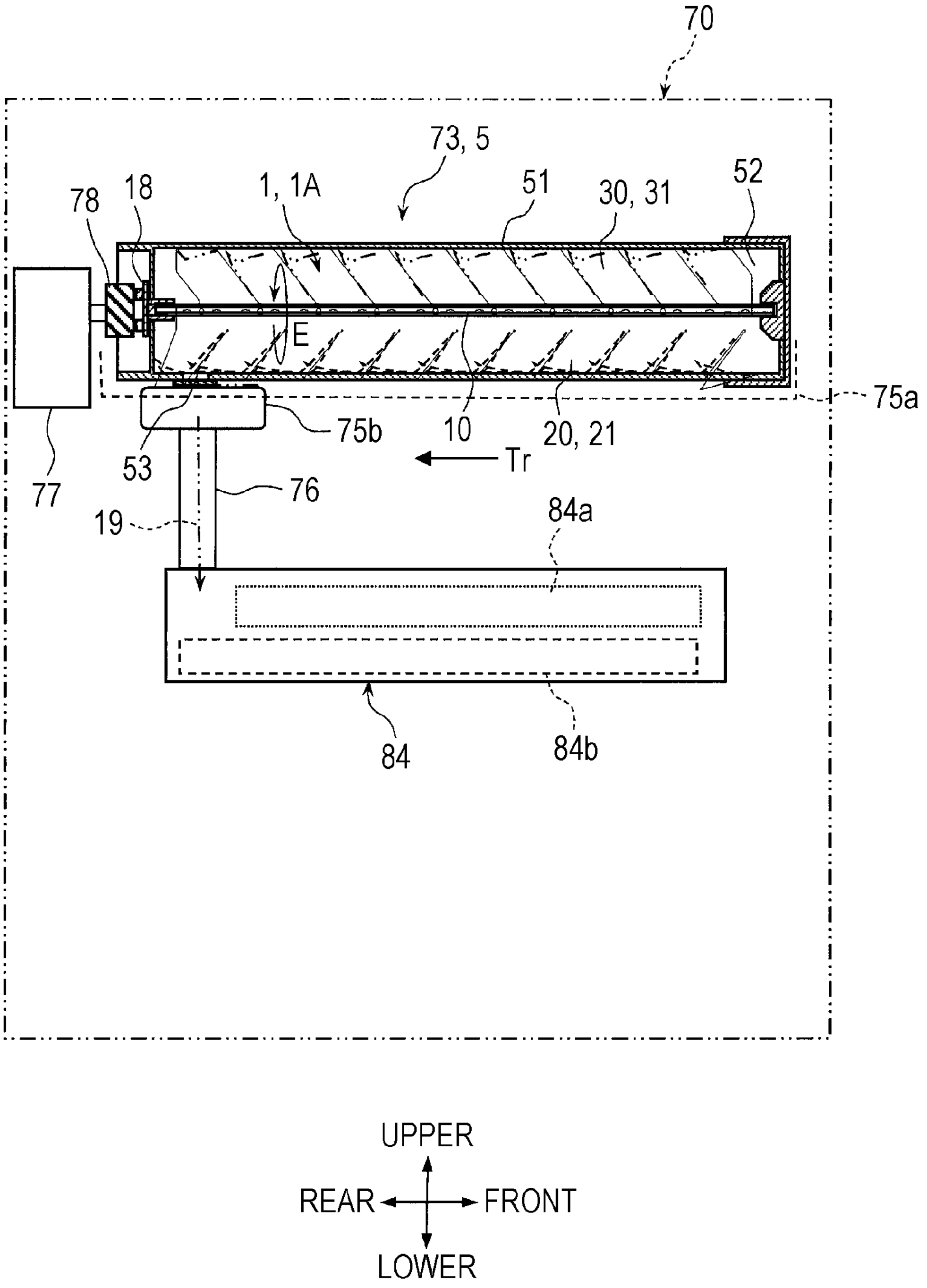
FIG. 17 is a schematic diagram of a part of the powder utilization device of FIG. 16.

FIG. 16 is a schematic diagram of a powder utilization device 7 according to a third embodiment of the present invention. FIG. 17 is a schematic diagram of a part of the powder utilization device 7 of FIG. 16.

<Powder Utilization Device>

The powder utilization device 7 includes a housing 70 having a predetermined external shape, a functional unit 8 disposed inside the housing 70 and using the powder 19, a supply unit 73 through which the powder 19 supplied to the functional unit 8 passes through the passage and is conveyed, and the like.

The powder utilization device 7 also includes a conveyance member 1 that is rotatably disposed in the passage of the supply unit 73 to convey the powder 19, a driving unit 77 that rotates the conveyance member 1, and the like.

In the powder utilization device 7 according to the third embodiment, a developer is used as the powder 19, and an image forming unit 8A that forms an image formed by the developer of the powder 19 on a sheet-shaped recording medium 89 is used as the functional unit 8. Accordingly, the powder utilization device 7 is formed as a so-called image forming device 7A.

The image forming device 7A which is an example of the powder utilization device 7 is constructed by applying the detachable exchange powder supply container 5 according to the first embodiment as the supply unit 73 and the conveyance member 1A according to the first embodiment as the conveyance member 1.

In this case, the passage of the supply unit 73 is the passage 52 of the powder supply container 5. The first conveyance unit 20 and the second conveyance unit 30 in the conveyance member 1 are suitable for the shape of the passage 52, conveyance conditions, and the like.

The image forming unit 8A of the functional unit 8 is a portion configured to form an image by applying, for example, an electrophotographic system.

As illustrated in FIG. 16, the image forming unit 8A includes a photosensitive drum 81 that is supported to rotate in a direction indicated by an arrow, and devices such as a charging device 82, an exposure device 83, a developing device 84, a transfer device 85, and a cleaning device 86 are disposed around the photosensitive drum 81. A fixing device 87 is disposed at a position away from the photosensitive drum 81 in the image forming unit 8A.

The photosensitive drum 81 is an example of an image carrier having a holding surface that holds an electrostatic latent image or an image formed by the developer (toner) of the powder 19.

The charging device 82 is a device that charges the holding surface of the photosensitive drum 81. The exposure device 83 is a device that forms an electrostatic latent image by exposing the charged holding surface of the photosensitive drum 81 based on image information input from the outside to the image forming unit 8A.

The developing device 84 is a device that forms a toner image by developing the electrostatic latent image formed on the holding surface of the photosensitive drum 81 with the developer. The developing device 84 includes a housing in which a developing roller 84*a*, a stirring conveyance member 84*b*, and the like are disposed. The amount of developer (toner) corresponding to the amount of consumed developer from the supply unit 73 is replenished to the developing device 84.

The transfer device 85 is a device that transfers the toner image formed on the holding surface of the photosensitive drum 81 to the sheet-shaped recording medium 89.

The cleaning device 86 is a device that cleans the holding surface by removing an unnecessary substance such as an unnecessary toner present on the holding surface of the photosensitive drum 81 after passing through the transfer device 85.

The fixing device 87 is a device that fixes an unfixed toner image transferred onto the recording medium 89 onto the recording medium 89 by applying heat and pressure thereto.

The image forming device 7A which is an example of the powder utilization device 7 includes a medium supply device 88 that contains and feeds the recording medium 89 supplied to the image forming unit 8A.

The medium supply device 88 includes, for example, devices such as a containing body 88*a* that can contain a plurality of recording media 89 and a feeding device 88*b* that feeds the recording media 89 contained in the containing body 88*a* one by one at a predetermined timing. The number of containing bodies 88*a* and the number of feeding devices 88*b* are not limited to one, and may be plural.

A dashed dotted line Tp in FIG. 16 indicates a main conveyance passage along which the recording medium 89 is conveyed within the housing 70. The recording medium 89 on which an image is formed by the image forming unit 8A passes through the conveyance passage Tp, and is discharged from a medium discharge port 70*c* in an upper portion of the housing 70 to a medium containing unit 70*a* and is stored therein.

As illustrated in FIGS. 16 and 17, the supply unit 73 includes the powder supply container 5, an attachment unit 75*a* to which the powder supply container 5 is detachably attached, a replenishing device 75*b* that replenishes the developer of the powder 19 fed from the powder supply container 5 to the developing device 84, a connection pipe 76 that feeds the developer of the powder 19 fed from the replenishing device 75*b* to the developing device 84, and the like.

The replenishing device 75*b* is a device that receives the developer of the powder 19 discharged from the powder supply container 5 and then feeds the amount of developer to be replenished to the developing device 84. The connection pipe 76 is connected to a portion of the developing device 84 where the stirring conveyance member 84*b* is disposed.

The driving unit 77 is a portion that generates a rotational force and transmits the rotational force to the conveyance member 1 in the supply unit 73. As in the case of the driving unit 67 in the second embodiment, the driving unit 77 includes, for example, a driving source such as a motor and a transmission mechanism that transmits a rotational power of the driving source. The transmission mechanism is configured such that a shaft coupling 78 provided in a transmission shaft is connected to the shaft coupling 18 at the other end of the shaft 10 of the conveyance member 1.

<Operation and Performance of Powder Utilization Device (Image Forming Device)>

In the image forming device 7A which is an example of the powder utilization device 7, when an operation of forming an image is executed in the image forming unit 8A of the functional unit 8, the amount of developer (toner) of the developing device 84 in the image forming unit 8A is gradually consumed and reduced.

In the image forming device 7A, when the amount of consumed (reduced) developer in the developing device 84 in the image forming unit 8A exceeds a predetermined amount, a required amount of developer (toner) of the powder 19 is supplied from the supply unit 73 toward the developing device 84.

In the image forming device 7A, when it is a time to supply the powder 19 from the supply unit 73, the rotational power is transmitted from the driving unit 77 to the shaft 10 of the conveyance member 1 (1A) in the powder supply container 5. Accordingly, as illustrated in FIGS. 16 and 17, in the image forming device 7A, the conveyance member 1 rotates around the shaft 10 within the passage 52 of the powder supply container 5 of the supply unit 73 in a direction of an arrow E.

At this time, as indicated by a broken line in FIG. 17, the conveyance member 1 in the powder supply container 5 circulates and rotates around the shaft 10 in a state where the first film 21 of the first conveyance unit 20 and the second film 31 of the second conveyance unit 30 are bent to be curved and warped to the upstream side of the shaft 10 in the rotational direction E within the passage 52.

At this time, in the conveyance member 1, the first conveyance unit 20 and the second conveyance unit 30 convey the developer of the powder 19 within the passage 52 in the conveyance direction Tr indicated by an arrow in FIG. 17.

Accordingly, the supply unit 73 discharges and feeds the developer of the powder 19 within the powder supply container 5 through the discharge port 53 to the replenishing device 75*b*. The supply unit 73 drives the replenishing device 75*b* for a predetermined time to feed a predetermined amount of powder 19 of the developer to the connection pipe 76.

As a result, the developer of the powder 19 is supplied and replenished from the powder supply container 5 of the supply unit 73 to the developing device 84.

In the powder utilization device 7 as the image forming device 7A, the conveyance member 1 in the powder supply container 5 of the supply unit 73 is formed by applying the conveyance member 1A and the like according to the first embodiment. Thus, substantially as in the case of the conveyance member 1A, in the image forming device 7A, even though the powder 19 is influenced by high humidity and temperature or vibration in the powder supply container 5, the powder 19 to be replenished can be conveyed to the developing device 84 in the image forming unit 8A of the functional unit 8 while the decrease in the conveyance ability of the powder 19 is suppressed.

In the powder utilization device 7 as the image forming device 7A, the conveyance member 1 in the powder supply containers 5 of the supply unit 73 is used in a state where the first film 21 of the first conveyance unit 20 and the second film 31 of the second conveyance unit 30 are bent to be warped to the upstream side of the shaft 10 in the rotational direction E. Thus, in the image forming device 7A, as compared with the case of the image forming device to which a conveyance member that is not used in this state is applied, the conveyance performance of the powder 19 by the conveyance member 1 is easily obtained, and the powder 19 in the powder supply container 5 is favorably conveyed.

Incidentally, in the image forming device 7A, when the amount of powder 19 contained within the powder supply container 5 becomes equal to or less than a predetermined amount, the powder supply container is replaced with a new powder supply container 5.

<Modification of Powder Utilization Device>

The image forming device 7A which is an example of the powder utilization device 7 is not limited to an image forming device in which the image forming unit 8A forms a monochrome image, and may be an image forming device in which the image forming unit 8A forms a multicolor image.

In the image forming device 7A, the supply unit 73 may be constituted by a fixed powder supply container 5 installed to be fixed within the housing 70 instead of the detachable exchange powder supply container 5. In this case, the container body 50 in the fixed powder supply container 5 may be a container body having the passages (the lower passage unit 62A and the upper passage unit 62B) having the same cross-sectional shape as the passage 62 (see FIG. 15) in the second embodiment instead of the passage 52 having the circular cross-sectional shape.

The powder utilization device 7 may be a device to which powder such as powder paint or edible powder is applied as the powder 19 instead of the developer. In this case, the functional unit 8 is formed as a portion having a function corresponding to the type of the powder 19.

Figure 18A:
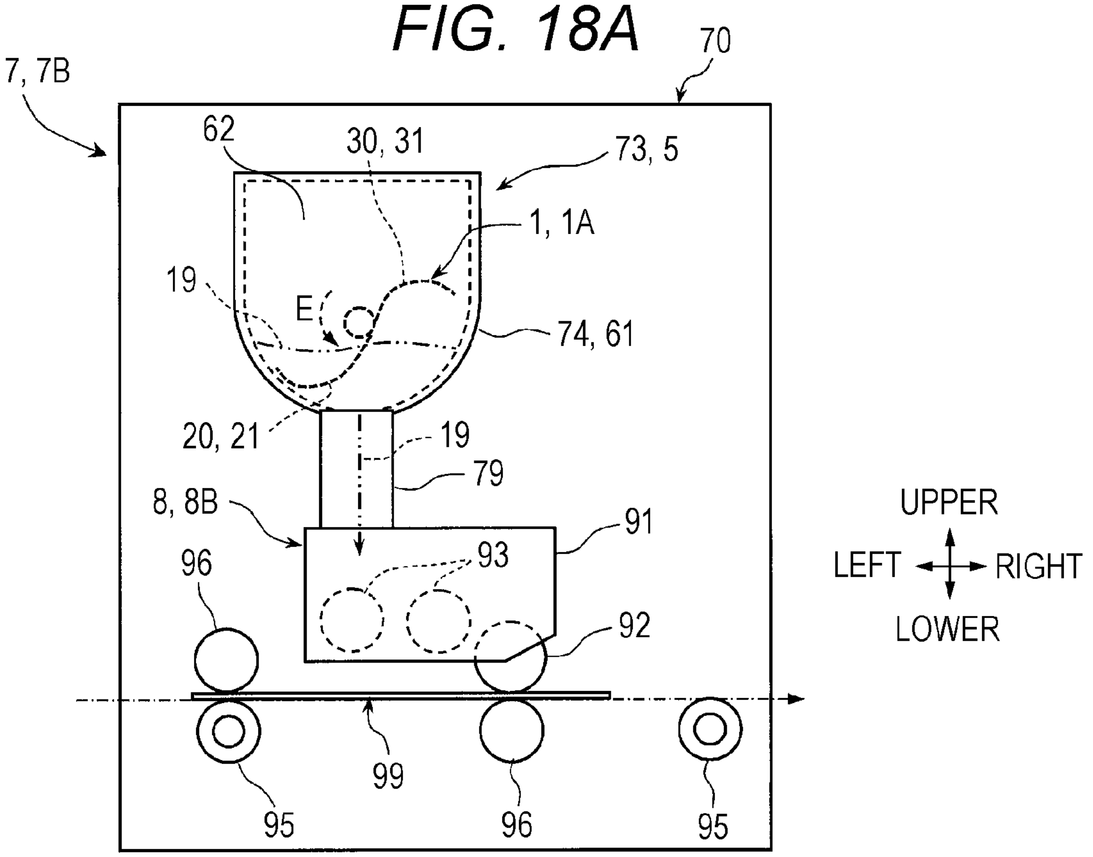
FIGS. 18A and 18B are schematic diagrams of a modification of the powder utilization device.
Figure 18B:
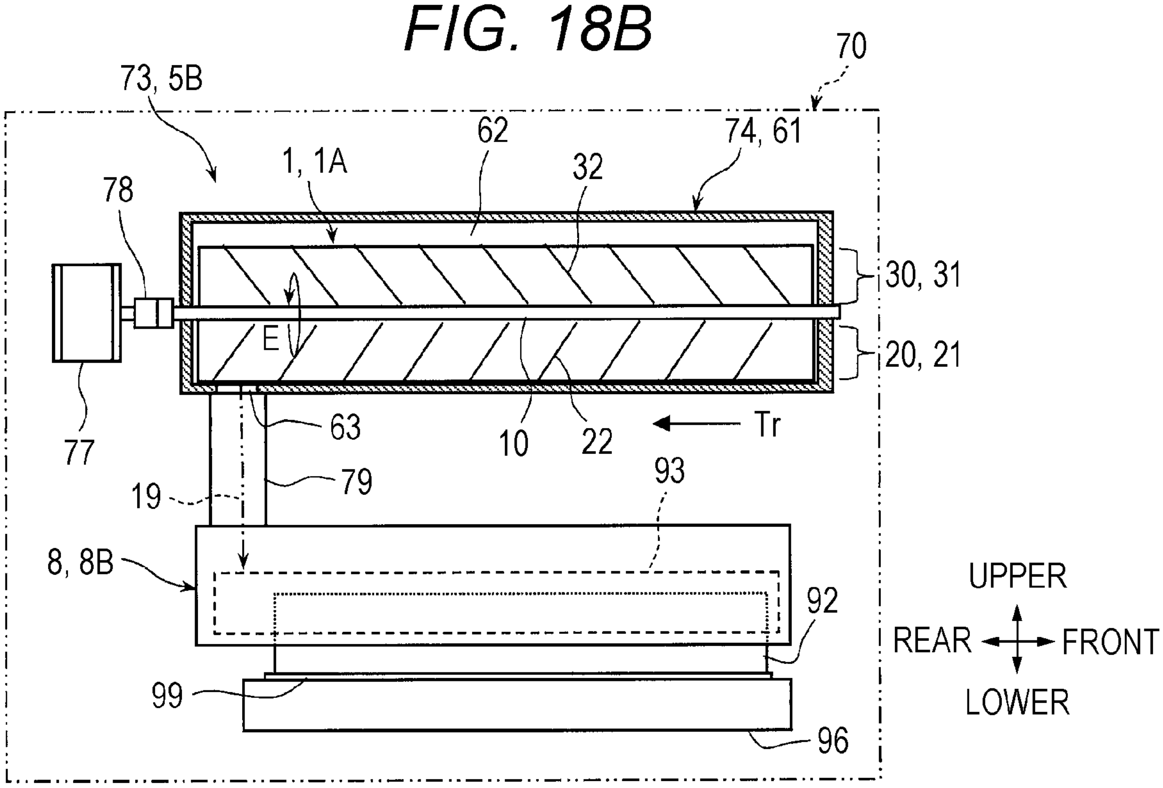

FIGS. 18A and 18B illustrate the powder utilization device 7 including a powder coating device 7B in which powder paint is applied as the powder 19 and a powder coating unit 8B is applied as the functional unit 8.

The powder coating device 7B which is an example of the powder utilization device 7 includes the housing 70 having a predetermined external shape, the powder coating unit 8B, the supply unit 73 to which the powder paint which is an example of the powder 19 supplied to the powder coating unit 8B is conveyed through the passage, the conveyance member 1 that is rotatably disposed in the passage of the supply unit 73 to convey the powder paint of the powder 19, the driving unit 77 that rotates the conveyance member 1, and the like.

The supply unit 73 in the powder coating device 7B includes, for example, a supply body 74 that contains the powder paint of the powder 19, a connection pipe 79 that feeds the powder paint of the powder 19 fed from the supply body 74 to the powder coating unit 8B, and the like.

A fixed supply body constituted by a part of the passage body 61 (a part excluding the intake port 64) in the second embodiment is used as the supply body 74. In the supply body 74, a conveyance member formed by applying the conveyance member 1A and the like according to the first embodiment is used as the conveyance member 1 that is rotatably disposed in the passage 62 (see FIG. 15) in the passage body 61.

In this case, the passage of the supply unit 73 is the passage 62 of the passage body 61. The first conveyance unit 20 and the second conveyance unit 30 in the conveyance member 1 are suitable for the shape of the passage 62, conveyance conditions, and the like. The driving unit 77 has the same configuration as the driving unit 77 in the third embodiment.

The powder coating unit 8B includes a coating device that includes a housing 91, a coating roller 92 that is rotatably disposed inside the housing 91 to perform powder coating, a stirring conveyance member 93 that finally conveys the powder paint of the powder 19 toward the coating roller 92 while stirring the powder paint inside the housing 91, and the like.

The powder coating unit 8B has a coated body conveyance device for supplying a coated body 99 to a coating device to cause the coated body to pass. The coated body conveyance device includes, for example, a conveyance driving roller 95, a conveyance roller 96, and the like.

<Operation and Performance of Powder Utilization Device (Powder Coating Device)>

In the powder coating device 7B which is an example of the powder utilization device 7, when an operation of performing powder coating of the powder paint of the powder 19 on the coated body 99 is executed in the powder coating unit 8B of the functional unit 8, the amount of powder coating within the housing 91 of the coating device in the powder coating unit 8B is gradually consumed and reduced.

In the powder coating device 7B, when the amount of consumed (reduced) powder paint in the powder coating unit 8B exceeds a predetermined amount, a required amount of powder paint of the powder 19 is supplied from the supply unit 73 toward the powder coating unit 8B.

In the powder coating device 7B, when it is a time to supply the powder 19 from the supply unit 73, the rotational power is transmitted from the driving unit 77 to the shaft 10 of the conveyance member 1 in the supply body 74. Accordingly, in the powder coating device 7B, as illustrated in FIGS. 18A and 18B, the conveyance member 1 rotates around the shaft 10 in a direction of an arrow E in the passage 62 in the supply body 74 of the supply unit 73.

At this time, as indicated by a broken line in FIG. 18A, the conveyance member 1 of the supply body 74 circulates and rotates around the shaft 10 in a state where the first film 21 of the first conveyance unit 20 and the second film 31 of the second conveyance unit 30 are bent to be curved and warped to the upstream side of the shaft 10 in the rotational direction E within the passage 62.

The conveyance member 1 at this time conveys the powder paint of the powder 19 within the passage 62 such that the first conveyance unit 20 and the second conveyance unit 30 feeds forward the powder paint in the conveyance direction Tr indicated by an arrow in FIG. 18B.

Accordingly, the supply unit 73 discharges and feeds the powder paint of the powder 19 within the supply body 74 from the discharge port 63 to the connection pipe 79.

As a result, the powder paint of the powder 19 is supplied and replenished from the supply body 74 of the supply unit 73 to the coating device in the powder coating unit 8B.

In the powder utilization device 7 including the powder coating device 7B, the conveyance member 1 of the supply body 74 of the supply unit 73 is formed by applying the conveyance member 1A and the like according to the first embodiment.

Thus, substantially as in the case of the conveyance member 1A, in the powder coating device 7B, even though the powder paint of the powder 19 is influenced by high humidity and high temperature or vibration in the supply body 74, the powder 19 to be replenished can be conveyed to the coating device in the powder coating unit 8B of the functional unit 8 while the decrease in the conveyance ability of the powder 19 is suppressed.

In the powder utilization device 7 including the powder coating device 7B, the conveyance member 1 in the supply body 74 of the supply unit 73 is used in a state where the first film 21 of the first conveyance unit 20 and the second film 31 of the second conveyance unit 30 are bent to be warped to the upstream side of the shaft 10 in the rotational direction E. Thus, in the powder coating device 7B, as compared with the case of the powder coating device to which the conveyance member that is not used in this state is applied, the conveyance performance of the powder 19 by the conveyance member 1 is easily obtained, and the powder 19 in the supply body 74 is favorably conveyed.

Incidentally, in the powder coating device 7B, when the amount of powder 19 contained within the supply body 74 becomes equal to or less than a predetermined amount, a new powder paint is replenished to the supply body 74.

What is claimed is:

1. A conveyance member comprising:

a shaft that is rotatably disposed in a passage through powder is conveyed;

a first conveyance unit that is provided at the shaft to project in a direction away from the shaft, and includes a plurality of first slits obliquely extending toward the shaft and a first film having flexibility; and a second conveyance unit that is provided at the shaft to project in a direction opposite to the first conveyance unit from the shaft, and includes a plurality of second slits obliquely extending toward the shaft and a second film having flexibility, wherein the first slit and the second slit are disposed in a positional relationship in which starting ends start to extend toward the shaft are shifted from each other in an axial direction with the shaft interposed therebetween.

2. The conveyance member according to claim 1, wherein the first conveyance unit and the second conveyance unit are provided in portions of the shaft that do not pass through a shaft core of the shaft.

3. The conveyance member according to claim 2, wherein the first conveyance unit and the second conveyance unit are provided at portions of the shaft shifted on the same side from the shaft core.

4. The conveyance member according to claim 1, wherein a length projecting from the shaft of the second film of the second conveyance unit is less than a length projecting from the shaft of the first film of the first conveyance unit.

5. The conveyance member according to claim 4, wherein the first conveyance unit has a length with which the first film comes into contact with the passage.

6. The conveyance member according to claim 1, wherein the first slit and the second slit have the same interval of the adjacent starting ends.

7. The conveyance member according to claim 1, wherein a length of the second slit extending toward the shaft is equal to or greater than a length of the first slit.

8. The conveyance member according to claim 7, wherein a distance, from the shaft, of a terminating end of the second slit extending toward the shaft is equal to or less than a corresponding distance for the first slit.

9. The conveyance member according to claim 1, wherein the first film and the second film are formed as one film.

10. A conveyance device comprising:

a passage body that has a passage through which powder is conveyed;

a conveyance member that is rotatably disposed in the passage body to convey the powder; and a driving unit that rotates the conveyance member, wherein the conveyance member is the conveyance member according to claim 1.

11. The conveyance device according to claim 10, wherein the first conveyance unit and the second conveyance unit are used in a state where the first film and the second film are bent to be warped to an upstream side of the shaft in a rotational direction.

12. A powder supply container comprising:

a container body that has a passage through which contained powder is conveyed toward a discharge port; and a conveyance member that is rotatably disposed in the passage of the container body to convey the powder, wherein the conveyance member is the conveyance member according to claim 1.

13. The powder supply container according to claim 12, wherein the first conveyance unit and the second conveyance unit are used in a state where the first film and the second film are bent to be warped to an upstream side of the shaft in a rotational direction.

14. A powder utilization device comprising:

a functional unit in which powder is used;

a supply unit to which powder supplied to the functional unit is conveyed through a passage;

a conveyance member that is rotatably disposed in the passage of the supply unit to convey the powder; and a driving unit that rotates the conveyance member, wherein the conveyance member is the conveyance member according to claim 1.

15. The powder utilization device according to claim 14, wherein the first conveyance unit and the second conveyance unit are used in a state where the first film and the second film are bent to be warped to an upstream side of the shaft in a rotational direction.

* * * * *